(12) United States Patent
Sumitomo

(10) Patent No.: US 9,177,389 B2
(45) Date of Patent: Nov. 3, 2015

(54) MOTION VECTOR GENERATION APPARATUS AND MOTION VECTOR GENERATION METHOD

(75) Inventor: Hironori Sumitomo, Moriguchi (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 522 days.

(21) Appl. No.: 13/143,514

(22) PCT Filed: Dec. 21, 2009

(86) PCT No.: PCT/JP2009/071248
§ 371 (c)(1),
(2), (4) Date: Jul. 6, 2011

(87) PCT Pub. No.: WO2010/079685
PCT Pub. Date: Jul. 15, 2010

(65) Prior Publication Data
US 2011/0274175 A1 Nov. 10, 2011

(30) Foreign Application Priority Data
Jan. 9, 2009 (JP) .................................. 2009-003655

(51) Int. Cl.
*H04N 7/32* (2006.01)
*G06T 7/20* (2006.01)
*H04N 5/14* (2006.01)
(Continued)

(52) U.S. Cl.
CPC ............... *G06T 7/204* (2013.01); *G06T 7/2086* (2013.01); *H04N 5/145* (2013.01); *H04N 19/523* (2014.11); *H04N 19/597* (2014.11); *G06T 2207/10021* (2013.01)

(58) Field of Classification Search
CPC ................... H04N 19/00684; H04N 19/00703
See application file for complete search history.

(56) References Cited

U.S. PATENT DOCUMENTS

2002/0154820 A1 10/2002 Kaneko et al.
2002/0159526 A1* 10/2002 Hekstra .................... 375/240.15
(Continued)

FOREIGN PATENT DOCUMENTS

| CN | 1396744 A | 2/2003 |
|---|---|---|
| CN | 1396774 | 2/2003 |

(Continued)

OTHER PUBLICATIONS

International Search Report in International Application No. PCT/JP2009/071248, mailed Feb. 2, 2010, 1 page.
(Continued)

*Primary Examiner* — Kate Luo
(74) *Attorney, Agent, or Firm* — Brinks Gilson & Lione

(57) ABSTRACT

In a motion vector generation apparatus 1 according to the present invention, when motion vectors are sequentially generated for a plurality of images, a target point is determined at a sub-pixel level in any of the plurality of images, a corresponding point corresponding to the target point is searched at the sub-pixel level in another image different from this image, and a motion vector is calculated on the basis of the target point and the corresponding point. Then, the corresponding point is defined as a new target point, and the aforementioned process is repeated to sequentially generate the motion vectors. Thus, the motion vector generation apparatus 1 of the present invention can compute consecutive motion vectors by performing correspondence search at the sub-pixel level in the plurality of images.

24 Claims, 12 Drawing Sheets

(51) Int. Cl.
*H04N 19/597* (2014.01)
*H04N 19/523* (2014.01)

(56) References Cited

U.S. PATENT DOCUMENTS

2004/0146183 A1 7/2004 Shimoni
2008/0267533 A1* 10/2008 Ida et al. .................. 382/299

FOREIGN PATENT DOCUMENTS

| | | |
|---|---|---|
| CN | 1741618 A | 3/2006 |
| CN | 101340578 A | 1/2009 |
| JP | 05-236452 A | 9/1993 |
| JP | 2001-084383 A | 3/2001 |
| JP | 2007-257026 A | 10/2007 |

OTHER PUBLICATIONS

Takita, Kenji, Muquit, Mohammad Abdul, Aoki, Takafumi, and Higuchi, Tatsuo, "A Sub-Pixel Correspondence Search Technique for Computer Vision Applications," IEICE Trans. Fundamentals. , vol. E87-A, No. 8, Aug. 2004, pp. 1913-1923.

Summary (in English) of the Office Action and Search Report Issued for Chinese Application No. CN 200980154233.4, mailed Mar. 26, 2013, 7 pages.

Extended European Search Report from corresponding European Patent Application No. 09837570.2 dated Oct. 10, 2014.

Tian, Q.; Huhns, M.N. "Algorithms for Subpixel Registration," *Computer Vision, Graphics and Image Processing*, 1986, 35, 220-233.

Argyriou, V.; Vlachos, T. "On the Estimation of Subpixel Motion Using Phase Correlation," *J. Elec. Imaging*, 2007, 16, 33018.

Kambhamettu, C.; Palaniappan, K.; Hasler, A.F. "Coupled Multi-Resolution Stereo and Motion Analysis," *IEEE*, 1995, 43-48.

* cited by examiner

IMAGE OF INTEREST          REFERENCE IMAGE

IMAGE OF INTEREST          REFERENCE IMAGE

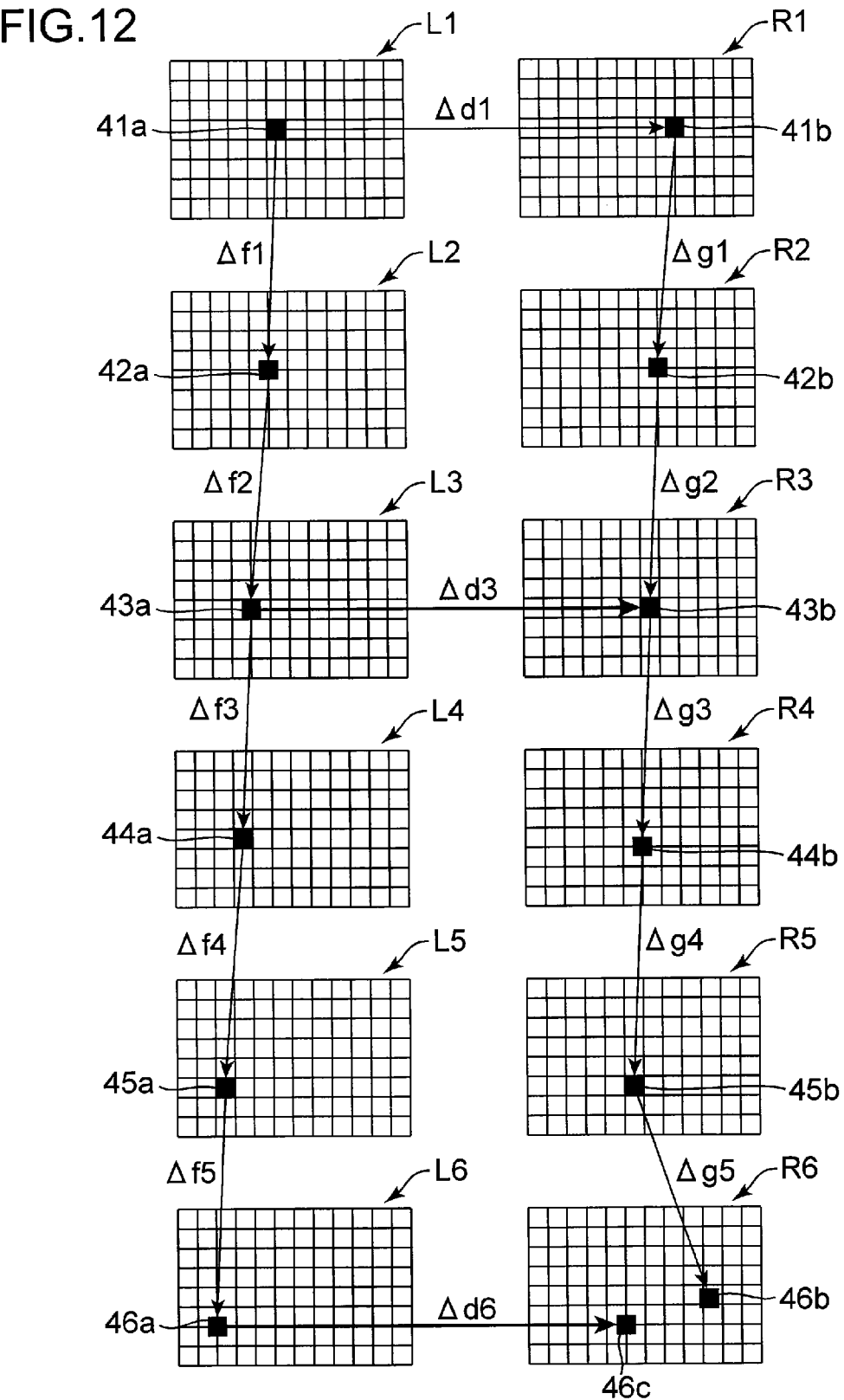

MOTION VECTOR GENERATION APPARATUS AND MOTION VECTOR GENERATION METHOD

This application is a National Stage application of International Application No. PCT/JP2009/071248, filed Dec. 21, 2009.

TECHNICAL FIELD

The present invention relates to a motion vector generation apparatus and a motion vector generation method for generating motion vectors by means of correspondence search between time-series images.

BACKGROUND ART

Various systems have been investigated for further safety improvements in recent automotive industry. In particular, image sensors equipped with a camera are employed. The image sensors are used for identification of an object and motion analysis of the object through the image processing of the captured images.

Motion analysis may be performed using, for example, a correlation technique. The correlation technique is based on finding, in the two images corresponding to each other, a point (corresponding point) in one of the images that corresponds to a target point in another image. More specifically, according to this correlation technique, a template is selected in the preceding image, i.e., an image of interest out of, for example, two time-series images such that a target point is included in this template, and two or more windows of the same size as the image of interest are defined on the subsequent image, i.e., a reference image. Then, a correlation value (similarity) is computed between the template in the image of interest and each window in the reference image to find such a window that has the largest correlation value in the reference image. The center of gravity of that window is determined as the corresponding point. With more than two time-series images, after the corresponding point is found, this corresponding point is used as a new target point to find another corresponding point in the later-captured images. Repeated cycles of this allow tracking of trajectory of the corresponding points from frame to frame, and motion vectors can be computed in a sequential manner. A motion vector is a vector that connects a certain point in one frame to the corresponding point in another frame. A known example of the correlation technique is, for example, a SAD (Sum of Absolute Difference) algorithm.

Various methods have been proposed to compute motion vectors. For example, Patent Document 1 describes a process of detecting a corresponding point by using block matching to compute motion vectors. With this method, a target point is selected at a pixel level (on a pixel by pixel basis). The corresponding point is found at the pixel level as well. However, if similarity during the block matching operation is low, the corresponding point is searched at a sub-pixel level, such as ½ pixel and ¼ pixel, that is smaller than 1 pixel to compute motion vectors. This allows the corresponding point search with high accuracy at the sub-pixel level, and based on which the motion vectors are computed. Motion analysis can thus be performed with high accuracy.

In addition, for example, Patent Document 2 describes a method of computing a motion vector by means of resolving a part of the image on the target point side to sub-pixel accuracy and resolving the whole image on the corresponding point side to sub-pixel accuracy to search the corresponding point during the template matching for the correspondence search. As a result, the search can be performed at the sub-pixel level, allowing the calculation of the motion vectors with high accuracy.

Furthermore, for example, Patent Document 3 describes a correspondence search method. Described is a method in which stereo images that are captured at different timings are used for the corresponding point search to generate distance information and a two-dimensional motion vector at each timing, and based on which a three-dimensional motion vector is generated. With this method, the target point and the corresponding point are given at the pixel level.

In addition, for example, Non-patent Document 1 discloses a technique for high-accuracy correspondence search using Phase-Only Correlation (POC). In this technique, a corresponding point at the pixel level in the reference image is calculated which corresponds to the target point at the pixel level in the image of interest. Then, the amount of displacement from the corresponding point is estimated at the sub-pixel level. The corresponding point at the sub-pixel level is calculated while considering the amount of displacement into the calculated corresponding point.

However, although the method disclosed in the Patent Document 1 calculates the corresponding point at the sub-pixel level, this corresponding point is used as the target point for the correspondence search in a subsequent time-series image, during which the target point is defined at the pixel level rather than the sub-pixel level. This means that the method disclosed in the Patent Document 1 converts the corresponding point found at the sub-pixel level into the one at the pixel level to find the corresponding point in the subsequent image. Thus, the method disclosed in this Patent Document 1 does not compute the motion vectors in a consecutive manner for a plurality of time-series images.

In the method disclosed in the Patent Document 2, the sub-pixel versions of the images are created with a restricted predetermined resolution. Accordingly, the method disclosed in this Patent Document 2 has a problem of errors in estimation accuracy. In addition, creating the sub-pixel versions of the images causes a problem of increasing operation time.

Moreover, the method disclosed in the Patent Document 3 does not consider the case where the position of the corresponding point is at the sub-pixel level. Accordingly, in the method disclosed in this Patent Document 3, the correspondence search will be performed to a position at the pixel level located near the position at the sub-pixel level even when it is at a sub-pixel level position. This means that an offset will be produced from the correct position of the corresponding point. It is impossible to obtain an exact value when distance information, a two-dimensional motion vector and a three-dimensional motion vector are computed based on the corresponding point that has thus found. Even if a value that is closer to the exact one can be obtained by means of interpolating the resulting information about the corresponding point, it is after all the interpolated one and is far from a highly-accurate one.

Furthermore, the method disclosed in the Non-patent Document 1, computes the amount of displacement between the target point and the corresponding point at the sub-pixel level during the intermediate stage of the operation, during which the target point in the image of interest is converted for operation into the point at the sub-pixel level. However, the search is not performed with the target point defined at the sub-pixel level. Accordingly, as in the case of the method disclosed in the Patent Document 1, the correct position of the corresponding point is not computed, and highly-accurate matching is therefore not obtained.

Patent Document 1: Japanese Patent Application Laid-Open No. H5-236452

Patent Document 2: Japanese Patent Application Laid-Open No. 2007-257026

Patent Document 3: Japanese Patent Application Laid-Open No. 2001-84383

Non-patent Document 1: Kenji TAKITA, Mohammad Abdul MUQUIT, Takafumi AOKI, Tatsuo HIGUCHI, "A Sub-Pixel Correspondence Search Technique for Computer Vision Applications", IEICE Transactions. Fundamentals, August 2004, E87-A, no. 8, pp. 1913-1923

SUMMARY OF THE INVENTION

The present invention is an invention made with respect to the aforementioned circumstances, and an object thereof is to provide a motion vector generation apparatus and a motion vector generation method for computing sequential motion vectors in a plurality of images.

In a motion vector generation apparatus and a motion vector generation method according to the present invention, when motion vectors are sequentially generated for a plurality of images, a target point is determined at a sub-pixel level in any of the plurality of images, a corresponding point corresponding to the target point is searched at the sub-pixel level in another image different from this image, and a motion vector is calculated on the basis of the target point and the corresponding point. Then, the corresponding point is defined as a new target point, and the aforementioned process is repeated to sequentially generate the motion vectors. Thus, the motion vector generation apparatus and the motion vector generation method according to the present invention can compute consecutive motion vectors by performing correspondence search at the sub-pixel level in the plurality of images.

These and other objects, features, and advantages of the present invention will become better understood when the following detailed description is read with reference to the accompanying drawings.

BRIEF DESCRIPTION OF THE DRAWINGS

FIG. 2 is a view for use in describing a template, in which

FIG. 12 is a view illustrating another method of assessing reliability of motion vectors.

BEST MODE FOR CARRYING OUT THE INVENTION

Figure 1:
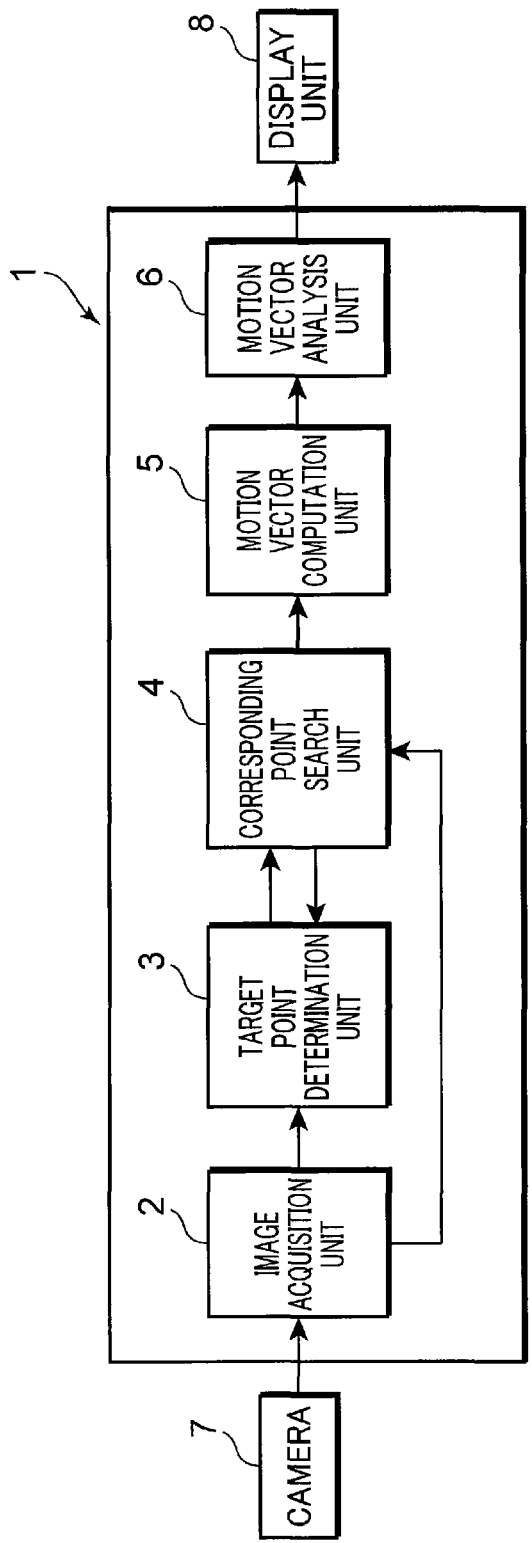
FIG. 1 is a block diagram showing a configuration of a motion vector generation apparatus according to an embodiment.

Hereinafter, an embodiment of the present invention is described with reference to the drawings, in which like reference numerals refer to like elements throughout, and redundant description thereof may be omitted as necessary.

First, a configuration of a motion vector generation apparatus according to an embodiment of the present invention is described. FIG. 1 is a block diagram showing a configuration of a motion vector generation apparatus according to this embodiment. As shown in FIG. 1, a motion vector generation apparatus 1 comprises an image acquisition unit 2, a target point determination unit 3, a corresponding point search unit 4, a motion vector calculation unit 5, and a motion vector analysis unit 6. The motion vector generation apparatus 1 is made up of, for example, electronic components and integrated circuit components, a CPU (Central Processing Unit), and a storage unit. The motion vector generation apparatus 1 is connected to a camera 7 and a display unit 8. The camera 7 is for taking time-series images and is thus preferably a stereo camera. More specifically, the camera 7 is comprised of two cameras that are placed side by side, spaced apart at a predetermined distance. The display unit 8 presents a display of the results obtained by the motion vector generation apparatus 1.

Each component of the motion vector generation apparatus 1 is described now.

The image acquisition unit 2 acquires time-series images from the camera 7 and holds them. The stereo cameras of the camera 7 make two simultaneous exposures of the same subject to produce a pair of images, and supply a collection of them as time-series stereo images to the motion vector generation apparatus 1. Two cameras of the camera 7 are placed with parallel optical axes, and optical aberration in the cameras is almost perfectly corrected. Such parallel camera geometry in the stereo camera produces parallel images. The camera 7 may be a monocular camera rather than a stereo camera. The time-series images may be obtained by acquiring images at different timings with a monocular camera.

The target point determination unit 3 determines a target point on an image (image of interest) among the images stored in the image acquisition unit 2. When the image of interest includes the point of origin of a motion vector, an arbitrary point in that image of interest is used as the target point. When it does not serve as the point of origin, the corresponding point in an image that has previously been captured is re-defined as the target point.

The corresponding point search unit 4 searches a point in the reference image that corresponds to the image of interest (correspondence search). The reference image refers to an image that corresponds to the image of interest. More specifically, in a stereo image, either one of a pair of images that are taken at the same time is referred to as the image of interest, and the other is referred to as the reference image. In the time-series images, the preceding or previous image of the images taken with the same camera is referred to as the image of interest, and the following or subsequent one is referred to as the reference image. A specific procedure of the correspondence search is described. A template is defined for the target point that is determined by the target point determination unit 3. A template in the reference image is searched that corresponds to the defined template. The corresponding point is found in the searched template. More specifically, the corresponding point search unit 4 takes the image of interest within which the target point is determined by the target point determination unit 3 to define a template containing the target point in the image of interest. The template as used herein refers to a range confined by a certain region in the image of interest, and has information (image pattern) such as a luminance value of each pixel within this range. The corresponding point search unit 4 computes correlation values between the template and each of the windows defined in the reference image that corresponds to the image of interest to determine whether these images correspond to each other according to the correlation value. The window herein refers to a region stretched to the same size as the template, and the reference image contains two or more windows defined therein. The window has information (image pattern) such as a luminance value of each pixel within this range. The correlation value can be computed from the image pattern of the template and the windows. For example, after a correlation value between the template and one of the windows is computed, and if it is determined that they do not correspond to each other because the correlation value is small, a correlation value is computed between the template and a window that is shifted from the latest window by one pixel in either direction. In this way, the window for which the correlation value has a peak value, that is, the window corresponding to the template can be determined. For the time-series images, the preceding or previous image is used as the image of interest and the following or subsequent image is used as the reference image, for example. Alternatively, the following or subsequent image may be used as the image of interest and the preceding or previous image may be used as the reference image. In other words, when the correspondence search is performed while taking time-series images, the preceding or previous image is used as the image of interest and the following or subsequent image is used as the reference image. However, when the time-series images are taken and these images are stored in, for example, the image acquisition unit 2 to perform the correspondence search with some quantity of images, the preceding or previous image is not necessarily used as the image of interest. Instead, the following or subsequent image may be used as the image of interest and the preceding or previous image may be used as the reference image.

Such correspondence search techniques are known and various approaches have been proposed. For example, a method of reducing the time duration required for computing the window corresponding to the template is briefly described below. For example, as described above, when the image of interest is one image of the stereo images and the reference image is the other image, and when the cameras with which the images were taken are placed in parallel to each other, the image of interest is provided almost in parallel to the reference image. Thus, it can be assumed that the windows in the reference image are on the same level as the target point in the image of interest. Therefore, what is required is to compute the correlation values only for the windows on that level. In addition, when the image of interest is provided almost in parallel to the reference image, and when the disparity between the image of interest and the reference image is known to some extent, the range within which the windows are defined can be limited further. Thus, by limiting the range within which the windows are defined, it is possible to limit the number of windows for which the correlation value relative to the template should be computed. This allows search of the corresponding window for a shorter period of time.

Another method is based on a search technique by a multiresolution strategy. With this method, the resolution is reduced for both the image of interest and the reference image, that is, the number of pixels is decreased before the computation of the correlation value(s). Then, coordinates at which the correlation value has the peak value relative to the target point are computed. Subsequently, the resolution is restored and the range within which the windows are defined is confined in the area around the coordinates obtained at a lower resolution to obtain the correlation value. With the image of interest and the reference image each having a lower resolution, the information of the image pattern can be reduced. The correlation value under such a circumstance can be computed for a shorter period of time. The coordinates at which the correlation value has the peak value at a normal resolution must be present at or near the thus-obtained coordinates at which the correlation value has the peak value at the lower resolution. As apparent from the above, it is possible to define the range within which the corresponding window is present for a short period of time, which allows window search for a short period of time. In this method, multiple low-resolution images may be generated stepwise to narrow down the area to be searched.

Next, how a correlation value is computed is described specifically. Known as a function to compute a correlation value are, for example, SAD (Sum of Absolute Difference) algorithm, SSD (Sum of Squared Difference) algorithm, and NCC (Normalize cross Correlation) algorithm. For example, the SAD algorithm adds up the absolute values in luminance in the template and window. The correlation value for each window can be obtained in accordance with the value given by that function.

In addition, there are some methods of computing a correlation value which are more robust than the aforementioned algorithms such as the SAD. More specifically, the similarity is computed by using a signal containing only the phase component with the amplitude component being limited from a frequency-resolved signal of an image pattern. This approach is insusceptible to, for example, the difference in image-pickup conditions between the right and left cameras for stereo images, and noises, and is therefore applicable to a robust computation of the correlation value(s). Known methods of computing the frequency-resolved signal of the image pattern include, for example, fast Fourier transform (FFT), discrete Fourier transform (DFT), discrete cosine transform (DCT), discrete sine transform (DST), wavelet transform, and Hadamard transform. Herein, among the robust computation of the correlation value, Phase-Only Correlation (hereinafter, referred to as "POC algorithm") is briefly described.

In the POC algorithm, the template is defined in the image of interest and the windows having the same size are defined in the reference image. The correlation value (the POC value) between the template and one of the windows is computed, with the windows being selected one after another in the reference image. The window corresponding to the template is computed according to the correlation value. First, the template in the image of interest and the window in the reference image are transformed using the two-dimensional discrete Fourier transform to be standardized. Then, they are combined and transformed using the two-dimensional reverse discrete Fourier transform. In this way, a POC value that is the correlation value can be computed. In addition, the POC value is computed in a discrete manner for each pixel, so that the similarity can be obtained for each pixel within the window. Accordingly, there is provided effects of the easy narrow-down of the range of the window and fast processing to find the corresponding point. More specifically, the abovementioned SAD algorithm relies on the computation to obtain the correlation value on a window by window basis, but the POC algorithm allows the computation of the correlation value for each pixel within the window. Thus, in a correlation value computation method such as the aforementioned POC algorithm, it is unnecessary to shift the window by one pixel each to compute the correlation value as in the case of the SAD algorithm. Instead, the window is shifted by an amount of some pixels to compute the correlation value. How much it can be shifted depends on the range over which the corresponding point can be searched. However, it is generally said that the range stretches over about a half of the window size. In other words, the window is shifted so that the shifted window is overlapped with the window before the shift by an amount of about half the window size. For example, if it is assumed that the maximum disparity between the image of interest and the reference image is equal to 128 pixels, the window size is equal to 31×31, and the range over which the search can be made by using the POC algorithm is ±8 pixels with respect to the position of the center of gravity, it is necessary to shift the windows by 16 pixel each to search for this disparity, so that eight windows are defined. In the POC algorithm, it is possible to use the search method using the above-mentioned multiresolution strategy. In the above-mentioned example, it is enough to define eight windows. However, when the image is reduced by 1/16 by using the search method based on the multiresolution strategy, it is necessary to define only one window. This further facilitates the correspondence search.

Such a technique is known, other than the POC algorithm, that the correlation value is computed by using a signal containing only the phase component with the amplitude component being limited from a frequency-resolved signal of an image pattern. An example includes a DCT sign-only correlation algorithm which may be used to perform the computation of the correlation value. The DCT sign-only correlation algorithm is a known algorithm and is disclosed in, for example, "Combining image signal processing and image pattern recognition-DCT sign-only correlation and its application", Hitoshi KIYA, Faculty of System Design, Tokyo Metropolitan University, JPSE Workshop on Dynamic Image Processing for Real Application, 2007, Mar. 8 and 9, 2007.

It should be noted that, in this embodiment, the search is performed at the sub-pixel level, so that the window(s) within the reference image is defined at the sub-pixel level rather than at the pixel level. A whole single pixel is not necessarily included in a window, and a part of the pixel may be included in that window. This means that the window does not necessarily confine a region with pixel accuracy.

Figure 2A:
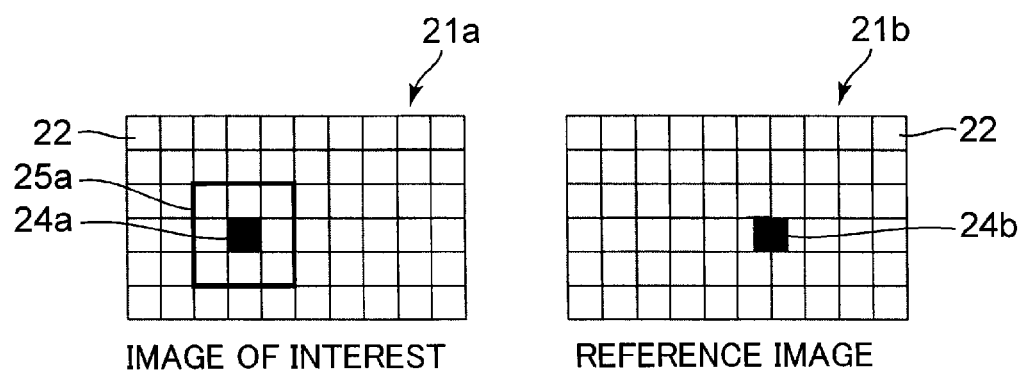
FIG. 2(A) is a view showing an image of interest and a reference image when a target point is at a pixel level position.
Figure 2B:
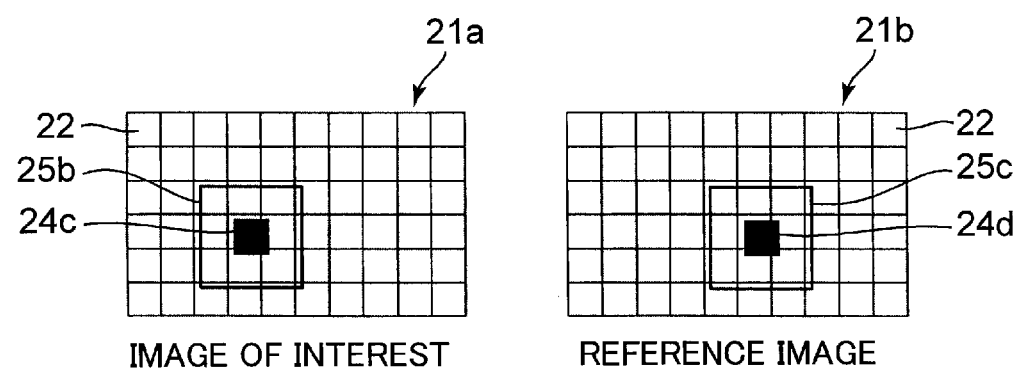
FIG. 2(B) is a view showing an image of interest and a reference image when a target point is a sub-pixel level.

More specifically, a window at a sub-pixel level is described. FIG. 2 is a view for use in describing a template, in which FIG. 2(A) is a view showing an image of interest and a reference image when a target point is at a pixel level position, and FIG. 2(B) is a view showing an image of interest and a reference image when a target point is at a sub-pixel level. As shown in FIG. 2(A), when a target point in a image of interest 21a having several pixels 22 is at a pixel level position, a template 25a of, for example, 3 by 3 is defined on the image of interest 21a, with a target point 24a being given as a position of the center of gravity. On the other hand, a window of 3 by 3 is defined on a reference image 21b having several pixels 22. The similarity between a pattern of the image in the template 25a in the image of interest 21a and a pattern of the image in the window in the reference image 21b, thereby a corresponding point 24b is determined. It should be noted that the sub-pixel level position can be obtained as shown in FIG. 2(A) by using, for example, interpolation during the search of the corresponding point 24b.

However, as shown in FIG. 2(B), when a target point 24c is displaced from the center of gravity of a pixel, a window made up of units of pixels cannot be defined. If it is necessary to define such a window, for example, the position of the target point 24c should be corrected to the position of the center of gravity of the pixel. However, this only produces a value that is displaced from the expected value. Taking this into consideration, the target point 24c is placed at the position of the center of gravity and the template 25b of 3 by 3 is defined without using the units of pixels. Then, the correlation value with respect to the window 25c in the reference image 21b is computed. The resulting correlation value is used to define the window 25c corresponding to the template 25b. The position of the center of gravity of that window 25c is computed as the corresponding point 24d. It should be noted that the target point 24a, the corresponding point 24b, the target point 24c, and the corresponding point 24d are all dots in practice, but they are illustrated to have the same size as the pixels in FIGS. 2(A) and 2(B), for the purpose of better visualization.

Now, described is a method of defining a template of which center of gravity is located at the sub-pixel level position. The template is defined at the sub-pixel level position, and therefore, the image pattern should be computed according to the arrangement of the pixels.

Figure 3:
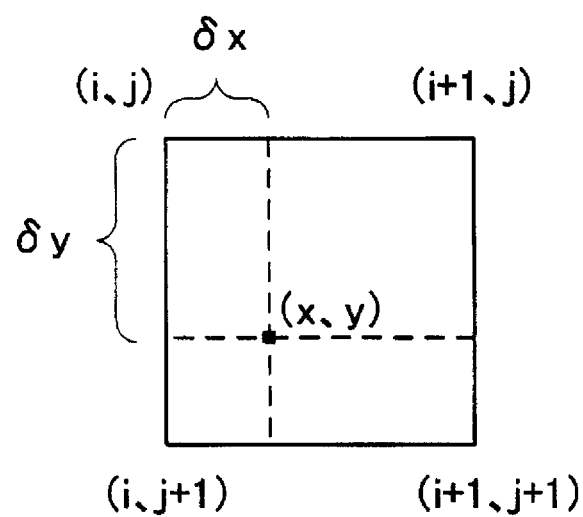
FIG. 3 is a view illustrating how to interpolate images.

As a first method of defining the template of which center of gravity is located at the sub-pixel level position, an image may be interpolated. FIG. 3 is a view illustrating how to interpolate images. In FIG. 3, (i, j), (i+1, j), (i, j+1), and (i+1, j+1) each represents the position of a pixel, and (x, y) represents the coordinates of the target point at the sub-pixel level position. In this case, in order to obtain the image pattern of the template of which center of gravity coincides with the target point, a luminance value at (x, y) should be determined. To this end, the luminance values for the pixels located around (x, y) are used to provide the luminance value at (x, y) by means of interpolation. Specifically, the luminance value at (x, y) is determined by the interpolation using the luminance values for the pixels at (i, j), (i+1, j), (i, j+1), and (i+1, j+1) that surround (x, y). In this way, the luminance value at the sub-pixel level position that is shifted from the pixel level position is determined to obtain the image pattern for the template. The template can thus be defined. Hereinafter, the luminance value I(x, y) at (x, y) is given in which the bilinear interpolation is used. I(i, j), I(i+1, j), I(i, j+1), and I(i+1, j+1) represent the luminance values for the respective pixels. It should be noted that the Equation 1 represents the coordinates position of (x, y), while the Equation 2 represents the luminance value thereof. In the equations, i and j are integers, respectively, δx and δy, are each a numeral that is larger than 0 but smaller than 1.

$$(x, y) = (i + \delta x, j + \delta y) \ldots \qquad (1)$$

$$I(x, y) = \{(1 - \delta x)(1 - \delta y) \times I(i, j)\} + \{(1 - \delta x) \times \delta y \times I(i+1, j)\} + \qquad (2)$$
$$\{\delta x \times (1 - \delta y) \times I(i, j+1)\} + \{\delta x \times \delta y \times I(i+1, j+1)\}$$

The case in which the bilinear interpolation is used is described above, but the luminance value at the sub-pixel level position may be obtained to define the template using interpolation other than the bilinear interpolation. For example, the interpolation may be performed by using, for example, the bicubic interpolation. This makes it possible to define the template.

A second method of defining the template of which center of gravity is located at the sub-pixel level position is to apply a window function. Among the aforementioned correspondence search methods, in a method where frequency resolution is involved, as in the case of, for example, the POC algorithm, the frequency is generally resolved after the application of the window function in order to avoid, for example, any effect of discontinuity for the frequency resolution. Examples of the window functions include Hanning window, Hamming window, and Kaiser window. In this second method, the window function includes the amount of displacement from the position of the pixel at the target point at the sub-pixel level position. As a result, in this second method, the template can be defined that has the image pattern at the sub-pixel level by applying the window function. Accordingly, how to add the amount of displacement to the window function is described. As an example herein, Hanning window is used for description. The equation of the Hanning window is given by Equation 3:

[Equation 3]

$$H(i) = \frac{1 + \cos\left(\frac{\pi i}{M}\right)}{2} \quad (3)$$

$-M \leq i \leq M$ ($i \in$ integer)
$2M+1$: size of a window function ($M \in$ integer)

Equation 3 represents a one-dimensional Hanning window. It is easy to transform it into a two-dimensional function. An equation representing a two-dimensional Hanning window is given by the Equation 4:

[Equation 4]

$$H(i, j) = \frac{1 + \cos\left(\frac{\pi i}{M}\right)}{2} \times \frac{1 + \cos\left(\frac{\pi j}{N}\right)}{2} \quad (4)$$

$-M \leq i \leq M$, $-N \leq j \leq N$ (i, j $\in$ integer)
$2M+1$, $2N+1$: size of a window function (M, N $\in$ integer)

The window function to be applied, which is obtained by taking the amount of displacement of the target point at the sub-pixel level position into the Equation 4, is given by the Equation 5:

$$DH(i, j) = \frac{1 + \cos\left(\frac{\pi(i + \delta x)}{M}\right)}{2} \times \frac{1 + \cos\left(\frac{\pi(j + \delta y)}{N}\right)}{2} \quad (5)$$

Figure 4:
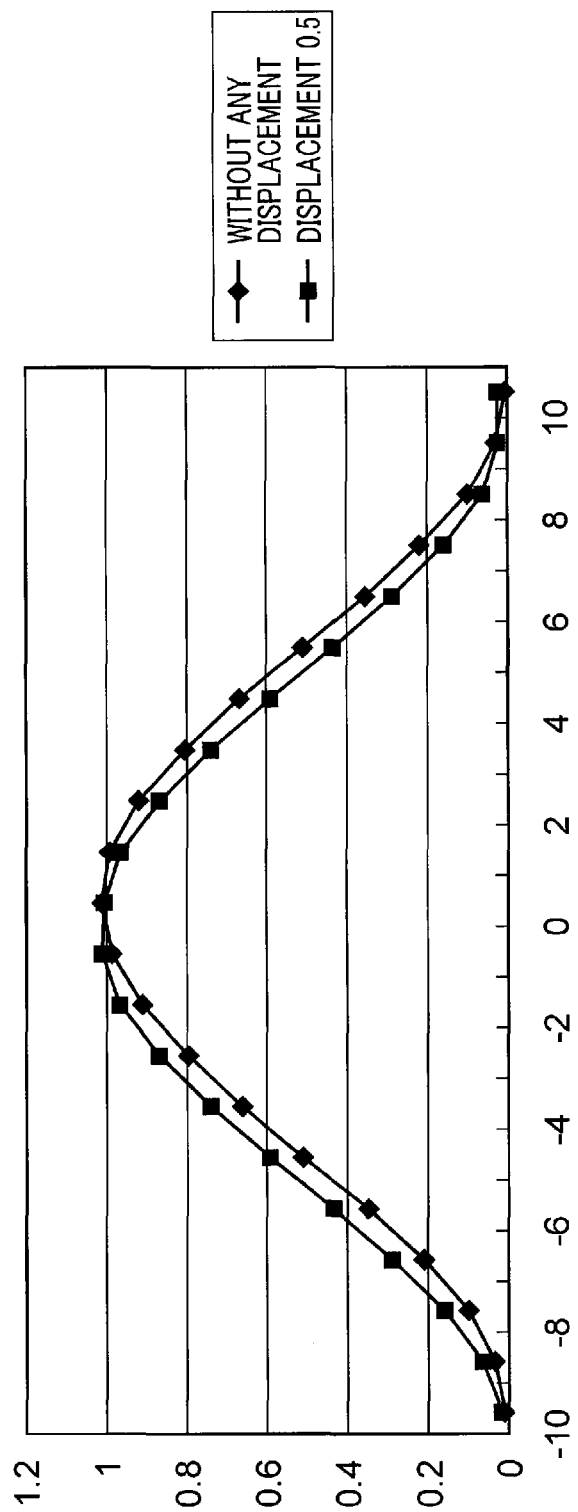
FIG. 4 is a view illustrating the window function including the amount of displacement.

FIG. 4 is a view illustrating the window function including the amount of displacement. FIG. 3 shows one-dimensional (x direction) functions, i.e., a window function with no amount of displacement (♦) and a window function with any amount of displacement δx of 0.5 (■). As apparent from FIG. 4, they are displaced from each other.

As described above, the second method applies the window function including the amount of displacement that has been obtained, and then resolves the frequency, to perform matching using, for example, the POC algorithm. It should be noted that it is possible to compute the luminance value I(x, y) of the target point at the sub-pixel level position even with a matching method such as SAD that does not require frequency resolution, by multiplying I(i, j) which is the luminance value at the pixel (i, j) by the window function including this amount of displacement. Specifically, the luminance value I(x, y) of the target point at the sub-pixel level position can be given by the Equation 6:

$$I(x, y) = DH(i,j) \times I(i,j) \quad (6)$$

Thus, the template of which center of gravity is located at the sub-pixel level position can be defined.

The amount of displacement may be included in a similar manner into a window function other than the Hanning window. This makes it possible to define the template of which center of gravity is located at the sub-pixel level position.

A third method of defining the template of which center of gravity is located at the sub-pixel level position is to rotate a phase component in a frequency domain. With this method, in a correspondence search technique using frequency resolution, when the amount of displacement at the sub-pixel level is calculated through iterative operation, it is unnecessary to perform the frequency resolution again. Instead, the template can be defined by rotating the phase component in the frequency domain. This allows fast correspondence search. This method of rotating the phase component in the frequency domain is a known technique, and is disclosed in, for example, "A High-Accuracy Passive 3D Measurement System Using Phase-Based Image Matching", IEICE Transactions. Fundamentals, March 2006, E89-A, no. 3, pp. 686-697, in particular, page 688, right column, lines 19 to 32 of this article.

Figure 5:
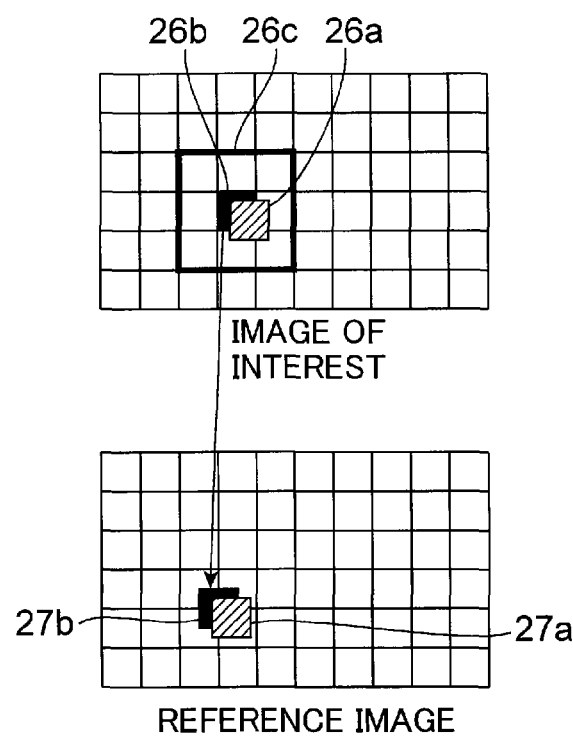
FIG. 5 is a view illustrating a method for shifting the target point to the nearest pixel to search the corresponding point and then correct it.

As a method of searching the corresponding point to the target point at the sub-pixel level, there is a method in which the target point is shifted to the nearest pixel, the template of which center of gravity is located at that pixel is used to compute the corresponding point, and thereafter the result is corrected, rather than defining the template of which center of gravity is located at the sub-pixel level position. This method is described. FIG. 5 is a view illustrating a method for shifting the target point to the nearest pixel to search the corresponding point and then correct it. In the image of interest in FIG. 5, a target point 26a is displaced from the position of the center of gravity of the pixel. Accordingly, in this method, a template 26c is defined of which center of gravity is located at a pixel 26b that is nearest to the target point 26a. Then, a corresponding point 27b in the reference image which corresponds to the center of gravity of the pixel 26b is searched. Subsequently, in the image of interest, a corresponding point 27a corresponding to the target point 26a is defined by shifting the corresponding point 27b by an amount equal to the amount of displacement δ from the center of gravity of the pixel 26b shifted from the target point 26a. For example, when the target point 26a has coordinates of (x1, y1) and the center of gravity of the pixel 26b has coordinates of (x2, y2), then a vector representing the amount of displacement δ can be given by (x1−x2, y1−y2). Herein, let coordinates of the corresponding point 27b to the position of the center of gravity of the pixel 26b be (x3, y3), the coordinates of the corresponding point 27a to the target point 26a can be obtained by adding a vector representing the amount of displacement δ. Specifically, the coordinates of the corresponding point 27a is given by (x1+x1−x2, y1+y1−y2).

Using the above-mentioned method, the corresponding point search unit 4 is only required to search the corresponding point at the sub-pixel level with respect to the target point at the sub-pixel level. It should be noted, when a search method according to the aforementioned multiresolution strategy is used, the target point in the image of interest may be given at the pixel level rather than with sub-pixel accuracy because resolution is coarse in the correspondence search using low resolution. This makes it possible to narrow down the range for the corresponding window, and the time required for the correspondence search using under a low resolution circumstance can further be reduced. Furthermore, in order to improve the accuracy of the matching with low resolution, the matching may be performed at the sub-pixel level with low resolution as well.

Figure 6:
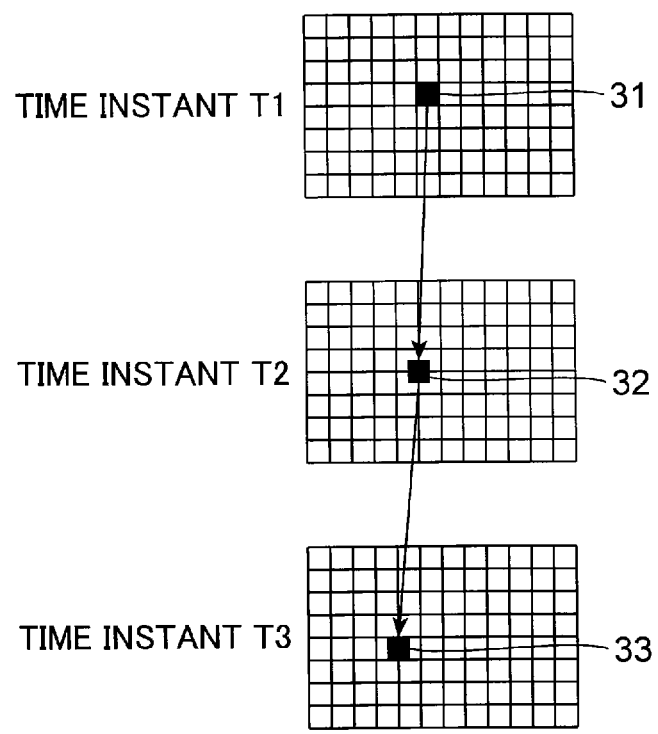
FIG. 6 is a view illustrating how to perform the correspondence search.

Now, how to search the corresponding point in the corresponding point search unit 4 for a plurality of time-series images is described with reference to the drawings. FIG. 6 is a view illustrating how to perform the correspondence search between images captured with a monocular camera. In FIG. 6, illustrated are images captured with the monocular camera at time instants T1, T2, and T3. It should be noted that the time instants T1, T2, and T3 proceed with time in this order. The target point is defined with the image at the time instant T1 used as the image of interest. This image is the first one, and the target point therein serves as the starting point. Accordingly, the target point is defined at the pixel level, i.e., in a unit of a pixel. In the images shown in FIG. 6, each small square represents one pixel. Therefore, the target point at the pixel level is located at the center of gravity of the small square. On the other hand, if it is at the sub-pixel level, the target point is not necessarily the position of the center of gravity of the small square. It should be noted that the points 31, 32, and 33 are all dots in practice, but they are illustrated to have the same size as the pixels in FIG. 6, for the purpose of better visualization.

The images captured with the camera 7 are stored on the image acquisition unit 2, so that the target point determination unit 3 acquires the image at the time instant T1 from the image acquisition unit 2 to determine the target point. For example, the point 31 is determined as the target point. Then, the corresponding point search unit 4 acquires, from the image acquisition unit 2, the image at the time instant T2 corresponding to the image at the time instant T1 to determine the point 32 that is the corresponding point to the point 31. In this case, the image at the time instant T1 serves as the image of interest and the image at the time instant T2 serves as the reference image. The point 32 is found at the sub-pixel level. Next, the corresponding point search unit 4 finds the corresponding point in the image at the time instant T3. In this case, the point 32 which is the corresponding point to the target point in the image at the time instant T1 serves as the target point. Taken this into consideration, the target point determination unit 2 determines the point 32 in the image at the time instant T2 as the target point. Then, the corresponding point search unit 4 obtains the image at the time instant T3 corresponding to the image at the time instant T2 from the image acquisition unit 2 to find a point 33 that is the corresponding point to the point 32. In this case, the image at the time instant T2 serves as the image of interest and the image at the time instant T3 serves as the reference image. The point 33 is found at the sub-pixel level. It should be noted that the correspondence search method to be used may be any one of the above-mentioned methods. As apparent from the above, in this embodiment, the correspondence search is performed at the sub-pixel level, thereby finding points corresponding to the points at the sub-pixel level. By sequentially searching the corresponding points in the time-series images as described above, a consecutive motion can be detected without any discontinuity of the motion vectors, and the target point, which is the starting point, can be followed precisely.

Figure 7:
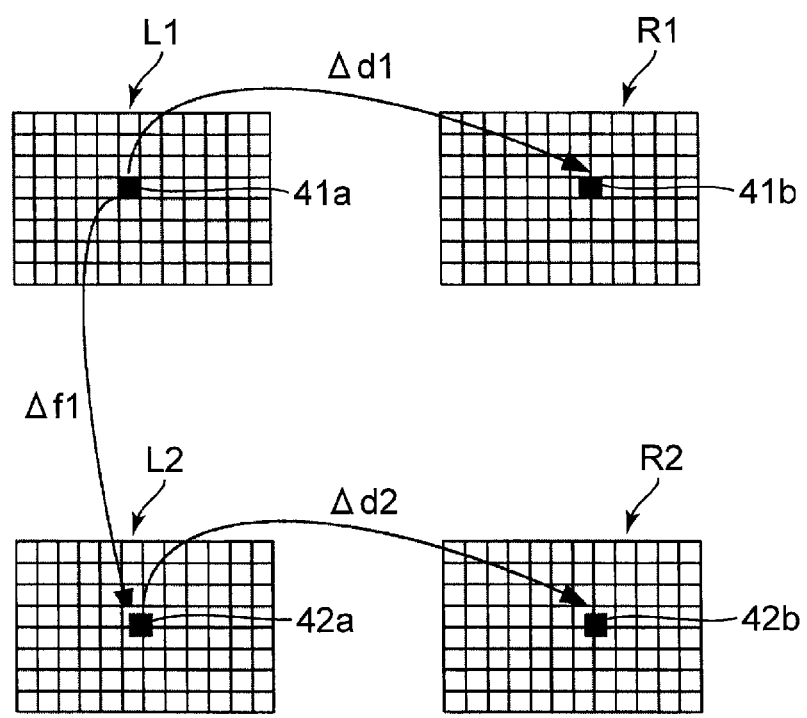
FIG. 7 is a view illustrating a method of calculating a three-dimensional motion vector for stereo images.

In the motion vector calculation unit 5, the motion vector is calculated from the value of the coordinates of the corresponding point in each of the time-series images obtained by the corresponding point search unit 4 as described above. More specifically, calculated are, for example, the distance information, the two-dimensional motion vector, and the three-dimensional motion vector, from, for example, the corresponding point and the target point found by the corresponding point search unit 4. FIG. 7 is a view illustrating a method of calculating a three-dimensional motion vector for stereo images. Now, with reference to FIG. 7, how to calculate the three-dimensional motion vector is described.

In FIG. 7, an image L1 and an image R1 are shown which are stereo images taken at the time instant T1. For the purpose of simplifying the description, it is assumed that the cameras are arranged in parallel to each other in the stereo camera where a pair of two cameras that have taken these images are arranged side by side. In addition, also shown are an image L2 and an image R2 taken at the time instant T2, which is the time instant after the time instant T1. First, it is assumed that a point 41*a* in the image L1 at the time instant T1 is provided as the target point (starting point). A point 41*b* in the image R1 point corresponding to the point 41*a* is found using the correspondence search. In addition, when the point 41*a* is used as the target point, a point 42*a* corresponding to the point 41*a* in the image L2 at the time instant T2 is found using the correspondence search. The point 42*a* is used as the target point to find a point 42*b* corresponding to this in the image R2 at the time instant T2 using the correspondence search. The points 41*a*, 41*b*, 42*a*, and 42*b* are all dots in practice, but they are illustrated to have the same size as the pixels in FIG. 7, for the purpose of better visualization.

It is assumed that the coordinates of the point 41*a* is (p1x, p1y), the coordinates of the point 41*b* is (q1x, q1y), the coordinates of the point 42*a* is (p2x, p1y), and the coordinates of the point 42*b* is (q2x, q2y). It should be noted that the vertical direction of the figure is the Y direction of each image while the horizontal direction is the X direction of each image. As described above, the cameras are arranged in parallel to each other, so that the Y coordinate of the point 41*a* is collinear with that of the point 41*b*. Likewise, the Y coordinate of the point 42*a* is collinear with that of the point 42*b*.

First, a vector $\Delta d1$ indicating the disparity between the images L1 and R1 can be computed from the point 41*a* and the coordinates of the point 41*b* obtained using the point 41*a*. Specifically, $\Delta d1$ is (q1x−p1x, 0). In addition, a vector $\Delta f1$ indicating motion in the image L1 and L2 can be computed from the point 41*a* and the coordinates of the point 42*a* obtained using the point 41*a*. Specifically, $\Delta f1$ is (p2x−p1x, p2y−p1y). In addition, a vector $\Delta d2$ indicating the disparity between the images at the time instant T2 can be computed from the point 42*a* and the coordinates of the point 42*b* obtained using the point 42*a*. Specifically, $\Delta d2$ is (q2x−p2x, 0).

A depth distance D1 of an image obtained using the image at the time instant T1 is determined according to $\Delta d1$. Specifically, it is the coordinate in the direction perpendicular to the plane of the drawing in FIG. 7, and the coordinate is referred to as a Z coordinate. Let us denote by f the focal length of each camera of the stereo camera that has taken the images L1, R1, L2, and R2, and let a base length between the cameras be B, D1 can be given by the Equation 7. In the Equation 7, $\Delta d1$ represents the magnitude of a vector.

$$D1 = fB/\Delta d1 \quad (7)$$

Likewise, a depth (Z coordinate direction) distance D2 of an image obtained using the image at the time instant T2 is given by the Equation 8 using $\Delta d2$. In the Equation 8, $\Delta d2$ represents the magnitude of a vector.

$$D2 = fB/\Delta d2 \quad (8)$$

The three-dimensional coordinates (X1, Y1, Z1) of the points 41a and 41b at the time instant T1 can be given by (p1x·D1/f, p1y·D1/f, D1), while the three-dimensional coordinates (X2, Y2, Z2) of the points 42a and 42b at the time instant T2 can be given by (p2x·D2/f, p2y·D2/f, D2).

The three-dimensional motion vector can be computed according to the three-dimensional coordinates (X1, Y1, Z1), and (X2, Y2, Z2). Specifically, the three-dimensional motion vector is a vector given by (X2−X1, Y2−Y1, Z2−Z1).

It should be noted that the two-dimensional motion vector is calculated from the time-series images captured with the monocular camera. In this case, only the images captured with one of the cameras should be taken into consideration from the images captured with the aforementioned stereo camera. For example, the images L1 and L2 are captured and the point 42a corresponding to the point 41a is searched. Then, the two-dimensional motion vector is computed from the points 41a and 42a. In other words, the two-dimensional motion vector can be given by the aforementioned Δf1.

Figure 8:
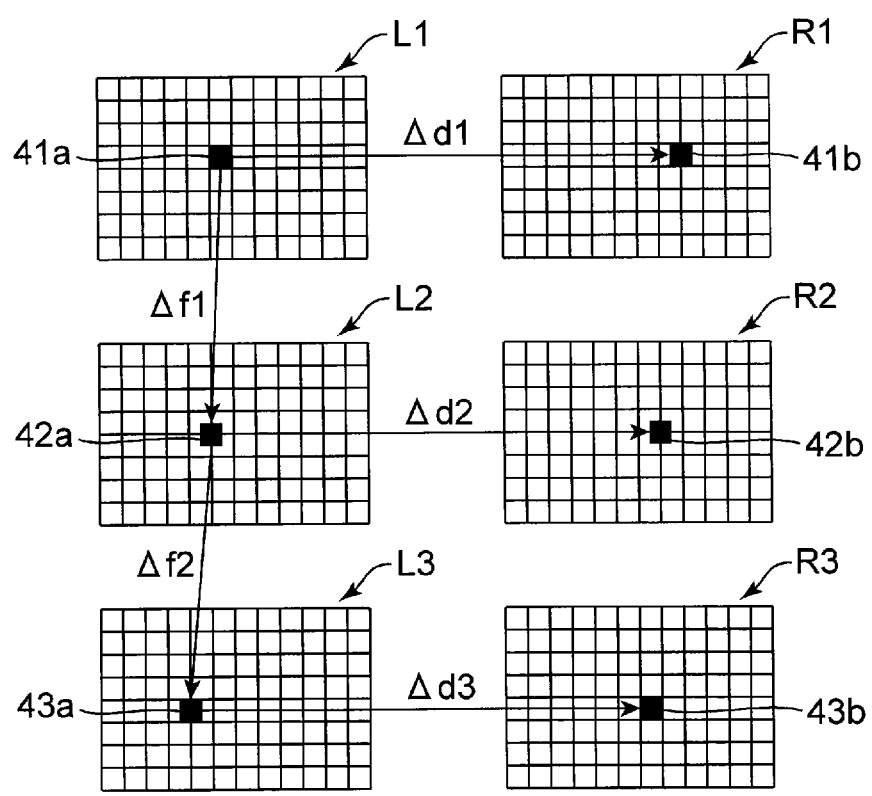
FIG. 8 is a view illustrating that three-dimensional motion vectors are linked consecutively in stereo time-series images.

In the time-series images that are sequentially captured with time, the corresponding points are found at the sub-pixel level as described above, and the three-dimensional motion vector is computed according to the coordinates thereof, which allows the motion vector generation apparatus 1 according to this embodiment to precisely track the trajectory of any point (starting point) in the time-series images. Description is made using more time-series images. FIG. 8 is a view illustrating that three-dimensional motion vectors are linked consecutively in stereo time-series images. In FIG. 8, shown are the image L1 and the image R1 that are stereo images taken at the time instant T1, the image L2 and the image R2 taken at the time instant T2, and an image L3 and an image R3 taken at the time instant T3. Using the point 41a in the image L1 at the time instant T1 as the target point, the point 41b that is the corresponding point in the image R1 at the time instant T1 is found using the correspondence search. Computation of the point 41b provides Δd1. Then, the point 42a in the image L2 at the time instant T2 that is the point corresponding to the point 41a in the image L1 is found using the correspondence search. Computation of the point 42a provides Δf1. Then, the point 42b in the image R2 at the time instant T2 that corresponds to the point 42a in the image L2 is found using the correspondence search. Computation of the point 42b provides Δd2. Then, the vectors Δd1, Δd2, and Δf1 are used to compute the three-dimensional motion vector between the time instant T1 and the time instant T2 as described above.

In addition, a point 43a which is the corresponding point in the image L3 at the time instant T3, corresponding to the point 42a in the image L2 at the time instant T2 is found using the correspondence search. Computation of the point 43a provides Δf2. Then, a point 43b in the image L3 at the time instant T3 which is the point corresponding to the point 43a in the image L3 is found using the correspondence search. Computation of the point 43b provides Δd3. Then, the vectors Δd2, Δd3, and Δf2 are used to compute the three-dimensional motion vector between the time instant T1 and the time instant T2 as well as the three-dimensional motion vector between the time instant T2 and the time instant T3.

Figure 9:
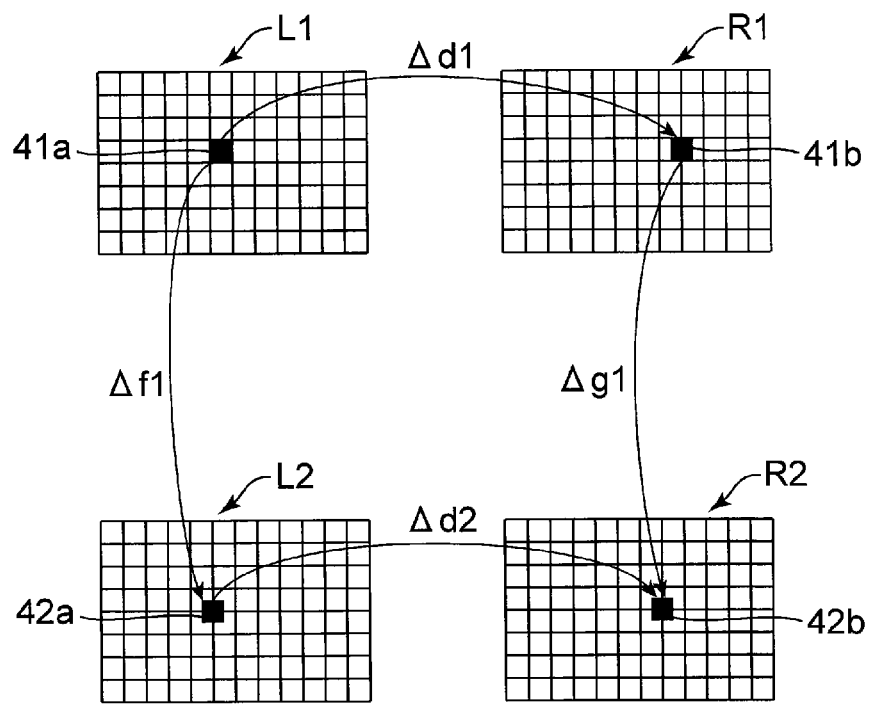
FIG. 9 is a view illustrating another method of calculating a three-dimensional motion vector in stereo images.

Next, another method of calculating a motion vector is described with reference to FIG. 9. FIG. 9 is a view illustrating another method of calculating a three-dimensional motion vector in stereo images. The images shown in FIG. 9 are similar to the images in FIG. 7, but how to find the point 42b is different from the method described in conjunction with FIG. 7. More specifically, first, it is assumed that the point 41a in the image L1 at the time instant T1 is provided as the target point (starting point). The point 41b in the image R1 that is the point corresponding to the point 41a is provided. In addition, when the point 41a is used as the target point, the point 42a corresponding to the point 41a is found in the image L2 at the time instant T2. Then, the point 41b is used as the target point to find the point 42b in the image R2 which corresponds to it is found using the correspondence search.

Subsequently, as in the case of FIG. 7, when it is assumed that the coordinates of the point 41a is (p1x, p1y), the coordinates of the point 41b is (q1x, q1y), the coordinates of the point 42a is (p2x, p2y), and the coordinates of the point 42b is (q2x, q2y), first, the vector Δd1 indicating the disparity between the images L1 and R1 is computed from the point 41a and the coordinates of the point 41b obtained using the point 41a. Specifically, Δd1 is (q1x−p1x, 0). In addition, the vector Δf1 indicating motion in the image L1 and L2 is computed from the point 41a and the coordinates of the point 42a obtained using the point 41a. Specifically, Δf1 is (p2x−p1x, p2y−p1y). In addition, a vector Δg1 indicating the disparity between the images R1 and R2 is computed from the point 41b and the coordinates of the point 42b obtained using the point 41b.

The vector Δd2 indicating the disparity between the image L2 and the image R2 can be given by the Equation 9 using Δf1, Δg1, and Δd1:

$$\Delta d2 = \Delta g1 - \Delta f1 + \Delta d1 \qquad (9)$$

Then, the distances D1 and D2 are obtained using Δd1, Δd2, the focal length f, the base length B, the Equation 7, and the Equation 8, from which the three-dimensional motion vector can be computed as described above. In other words, the three-dimensional coordinates (X1, Y1, Z1) of the points 41a and 41b at the time instant T1 can be given by (p1x·D1/f, p1y·D1/f, D1), and the three-dimensional coordinates (X2, Y2, Z2) of the points 42a and 42b at the time instant T2 can be given by (p2x·D2/f, p2y·D2/f, D2). According to the three-dimensional coordinates (X1, Y1, Z1), and (X2, Y2, Z2), the three-dimensional motion vector is a vector given by (X2−X1, Y2−Y1, Z2−Z1).

Figure 10:
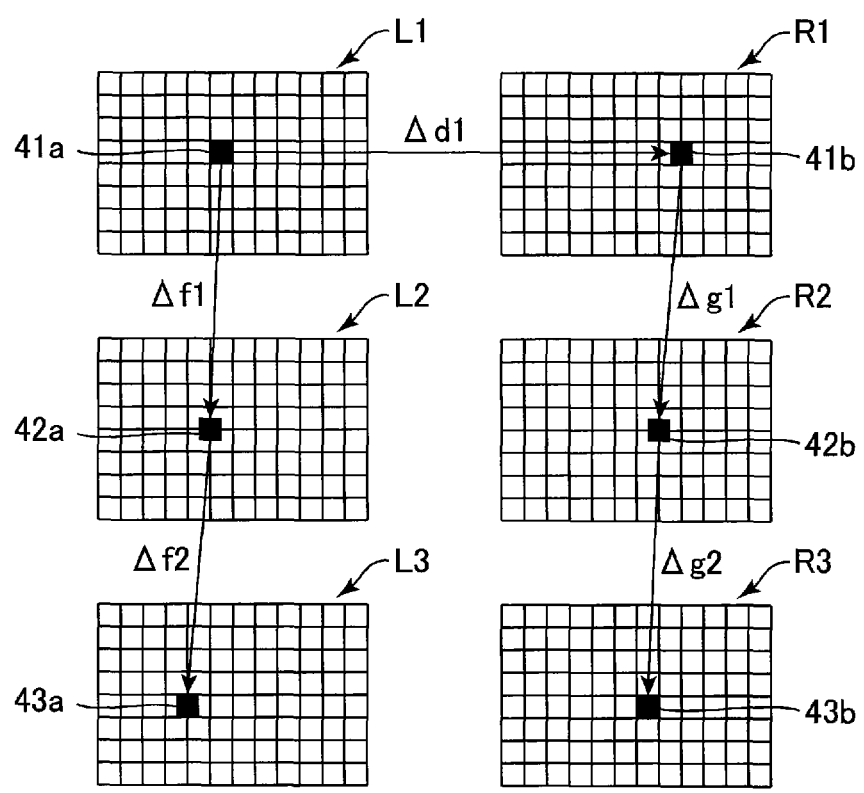
FIG. 10 is another view illustrating that three-dimensional motion vectors are linked consecutively in stereo time-series images.

In the time-series images that are sequentially captured with time, the corresponding points are found at the sub-pixel level as described above, and the three-dimensional motion vector is computed according to the coordinates thereof, which allows the motion vector generation apparatus 1 according to this embodiment to precisely track the trajectory of any point (starting point) in the time-series images. Description is made using more time-series images. FIG. 10 is another view illustrating that three-dimensional motion vectors are linked consecutively in stereo time-series images. In FIG. 10, shown are the image L1 and the image R1 that are stereo images taken at the time instant T1, the image L2 and the image R2 taken at the time instant T2, and an image L3 and an image R3 taken at the time instant T3. Using the point 41a in the image L1 at the time instant T1 as the target point, the point 41b that is the corresponding point in the image R1 at the time instant T1 is found using the correspondence search. Computation of the point 41b provides Δd1. Then, the point 42a in the image L2 at the time instant T2 that is the point corresponding to the point 41a in the image L1 is found using the correspondence search. Computation of the point 42a provides Δf1. Then, the point 42b in the image R2 at the time instant T2 that corresponds to the point 41b in the image R1 is found using the correspondence search. Computation of the point 42b provides Δg1. Then, the vectors Δd1, Δf1, and Δg1 are used to compute the three-dimensional motion vector between the time instant T1 and the time instant T2 as described above.

In addition, a point 43a which is the corresponding point in the image L3 at the time instant T3, corresponding to the point 42a in the image L2 at the time instant T2 is found using the correspondence search. Computation of the point 43a provides Δf2. Then, a point 43b in the image R3 at the time instant T3 which is the point corresponding to the point 42b in the image R2 is found using the correspondence search. Computation of the point 43b provides Δg2. Then, the vectors Δd1, Δf1, Δg1, Δf2, and Δg2 are used to compute the three-dimensional motion vector between the time instant T1 and the time instant T2 as well as the three-dimensional motion vector between the time instant T2 and the time instant T3.

As described above, as the correspondence search technique for calculating motion vectors in the time-series stereo images, there are two methods as shown in FIGS. 7 and 8 as well as FIGS. 9 and 10. The corresponding point search unit 4 performs the correspondence search using either method and, in response to this, the motion vector calculation unit 5 calculates the motion vector. It is preferable for the corresponding point search unit 4 to use the same correlation value operation (the SAD algorithm, the POC algorithm, or other method) even when there are different reference images when, for example, a corresponding point in two or more reference images is searched with respect to the same target point during the correspondence search. In other words, in such circumstances, a common template can be shared among the reference images for the target point, which provides an effect of simplifying the computation operation. Accordingly, it is preferable that the correlation value computation operation used by the corresponding point search unit 4 is one of the computation methods. In addition, when a robust correlation value computation method such as the aforementioned POC algorithm is used as the correlation value computation method, and when the corresponding point in two or more reference images is searched with respect to the same target point, it is preferable to use the same image pattern of the template of which frequency is resolved and amplitude component is restricted even when there are different reference images. With such a configuration, the image pattern of the template of which frequency is resolved and amplitude component is restricted can be shared, which provides an effect of reducing the operation process time.

In addition, as described above, as the correspondence search technique for calculating motion vectors in the time-series stereo images, there are two methods. For example, as shown in FIG. 8, the method in which the corresponding point is found in one of a pair of stereo images, and as shown in FIG. 10, the method in which the corresponding point is found based on the image that has taken previously. In FIG. 8, in order to find the corresponding point in the images R2 and R3, the images L2 and L3 are used. On the other hand, in FIG. 10, in order to find the corresponding point in the images R2 and R3, the images R1 and R2 are used. As apparent from this, the same corresponding point can be given from two or more target points. By using this, it is possible to assess the reliability of the calculated motion vector. More specifically, the corresponding point search unit 4 searches a single corresponding point to two or more target points among the aforementioned two or more target points, and determines that the calculated motion vector is highly reliable when the same corresponding point is found therefrom, and that the calculated motion vector is not reliable when different corresponding points are given therefrom.

Figure 11:
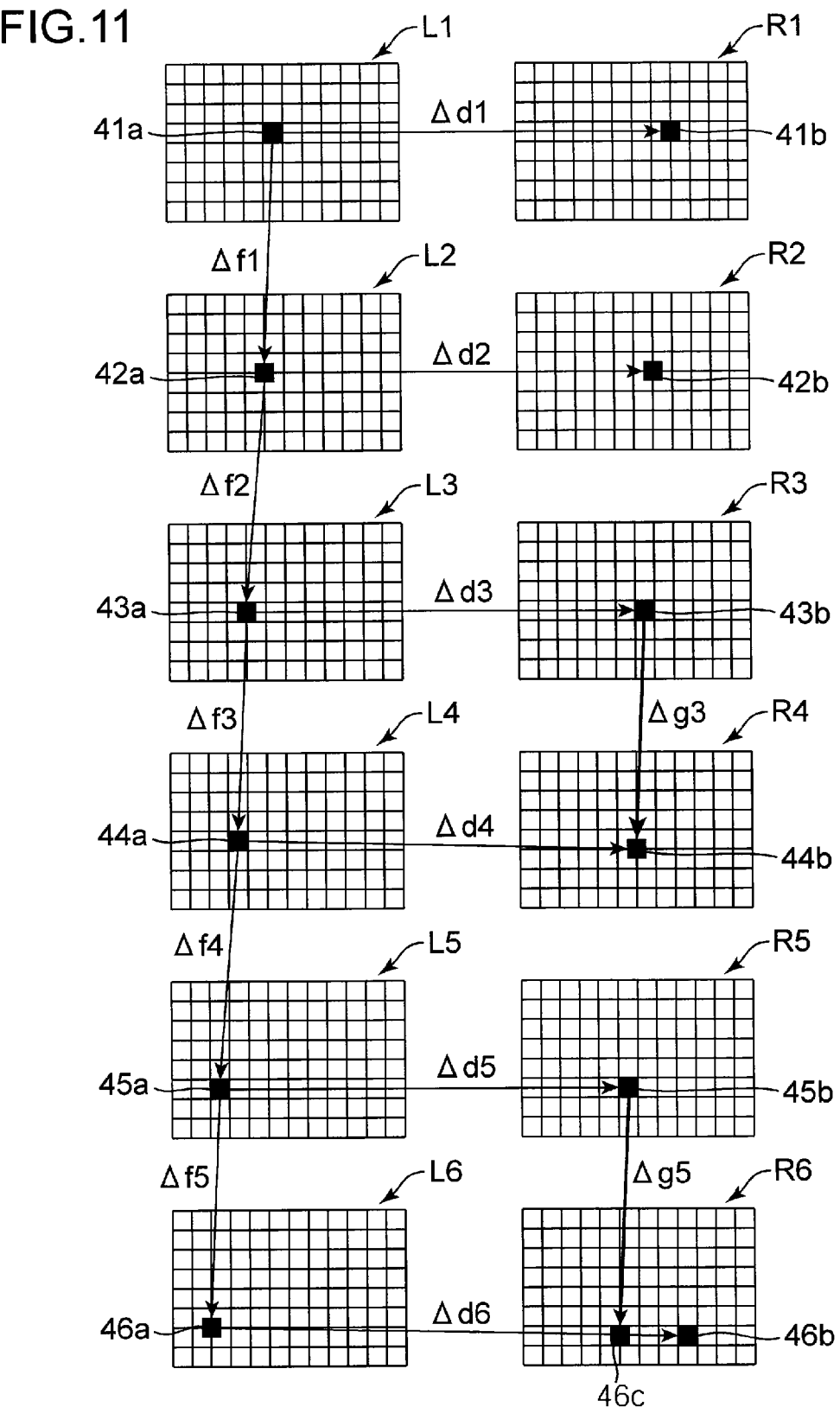
FIG. 11 is a view illustrating a method of assessing reliability of motion vectors.

Now, described more specifically is a method of assessing reliability of motion vectors. FIG. 11 is a view illustrating a method of assessing reliability of motion vectors. In FIG. 11, there are the images L1 to L6 and the images R1 to R6 which are stereo time-series images at the time instants T1 to T6. The images L1 to L6 and the images R1 to R6 are corresponding to each other. In this case, the corresponding point search unit 4 and the motion vector calculation unit 5 use the point 41a in the image L1 as the target point (starting point) to find the point 41b in the image R1 using the correspondence search to provide Δd1. Then, the point 42a in the image L2 corresponding to the point 41a in the image L1 is found using the correspondence search to provide Δf1. Then, the point 42b in the image R2 corresponding to the point 42a in the image L2 is found using the correspondence search to provide Δd2. Then, the point 43a in the image L3 corresponding to the point 42a in the image L2 is found using the correspondence search to provide Δf2. Then, the point 43b in the image R3 corresponding to the point 43a in the image L3 is found using the correspondence search to provide Δd3. Then, a point 44a in the image L4 corresponding to the point 43a in the image L3 is found using the correspondence search to provide Δf3. Then, a point 44b in the image R4 corresponding to the point 44a in the image L4 is found using the correspondence search to provide Δd4. Then, a point in the image R4 corresponding to the point 43b in the image R3 is found using the correspondence search to provide Δg3. Here, the point 44b is searched from two points 44a and 43b. In this case, the same point 44b is searched from both points, so that the reliability of the correspondence search can be considered to be high. In this way, in any image, the corresponding point corresponding to two points is searched for the aforementioned two points to check whether the same point can be searched, thereby the reliability of the correspondence search can be assessed.

Then, in this case, since there is no problem of the correspondence search, the corresponding point search unit 4 and the motion vector calculation unit 5 continue the correspondence search and calculation of motion vectors. A point 45a in the image L5 corresponding to the point 44a in the image L4 is found using the correspondence search to provide Δf4. Then, a point 45b in the image R5 corresponding to the point 45a in the image L5 is found using the correspondence search to provide Δd5. Then, a point 46a in the image L6 corresponding to the point 45a in the image L5 is found using the correspondence search to provide Δf5. Then, a point 46b in the image R6 corresponding to the point 46a in the image L6 is found using the correspondence search to provide Δd6. Then, a point 46c in an image R6 corresponding to a point 45b in an image R5 is found using the correspondence search to provide Δg5. At this time, the point 46b and the point 46c must have the same coordinates, but they have different coordinates. Accordingly, in this case, it is said that the reliability of the correspondence search is low. In such a case, the motion vector generation apparatus 1 of the embodiment detects an error. The operation of the motion vector generation apparatus 1 may be stopped or, alternatively, a corresponding point may further be searched among the searched points for a possibly exact point to calculate a motion vector.

Now, described more specifically is another method of assessing reliability of motion vectors. FIG. 12 is a view illustrating another method of assessing reliability of motion vectors. In FIG. 12, as in FIG. 11, there are the images L1 to L6 and the images R1 to R6 which are stereo time-series images at the time instants T1 to T6. The images L1 to L6 and the images R1 to R6 are corresponding to each other. The method of assessing reliability of motion vectors shown in FIG. 12 is different from the one shown in FIG. 11 in the correspondence search and how to calculate the motion vectors. In this case, the corresponding point search unit 4 and the motion vector calculation unit 5 use the point 41a in the image L1 as the target point (starting point) to find the point 41b in the image R1 using the correspondence search to provide Δd1. Then, the point 42a in the image L2 corresponding to the point 41a in the image L1 is found using the correspondence search to provide Δf1. Then, the point 42b in the image R2 corresponding to the point 41b in the image R1 is found using the correspondence search to provide Δg1. Then, the point 43a in the image L3 corresponding to the point 42a in the image L2 is found using the correspondence search to provide Δf2. Then, the point 43b in the image R3 corresponding to the point 42b in the image R2 is found using the correspondence search to provide Δg2. Then, a point in the image R3 corresponding to the point 43a in the image L3 is found using the correspondence search to provide Δd3. Here, the point 43b is searched from two points 43a and 42b. In this case, the same point 43b is searched from both points, so that the reliability of the correspondence search can be considered to be high. In this way, in any image, the corresponding point corresponding to two points is searched for the aforementioned two points to check whether the same point can be searched, thereby the reliability of the correspondence search can be assessed.

Then, in this case, since there is no problem of the correspondence search, the corresponding point search unit 4 and the motion vector calculation unit 5 continue the correspondence search and calculation of motion vectors. Then, the point 44a in the image L4 corresponding to the point 43a in the image L3 is found using the correspondence search to provide Δf3. Then, the point 44b in the image R4 corresponding to the point 43b in the image R3 is found using the correspondence search to provide Δg3. Then, the point 45a in the image L5 corresponding to the point 44a in the image L4 is found using the correspondence search to provide Δf4. Then, the point 45b in the image R5 corresponding to the point 44b in the image R4 is found using the correspondence search to provide Δg4. Then, the point 46a in the image L6 corresponding to the point 45a in the image L5 is found using the correspondence search to provide Δf5. Then, a point 46b in the image R6 corresponding to the point 45b in the image R5 is found using the correspondence search to provide Δg5. Then, the point 46c in the image R6 corresponding to the point 46a in the image L6 is found using the correspondence search to provide Δd6. At this time, the point 46b and the point 46c must have the same coordinates, but they have different coordinates. Accordingly, in this case, it is said that the reliability of the correspondence search is low. In such a case, the motion vector generation apparatus 1 of the embodiment detects an error. The operation of the motion vector generation apparatus 1 may be stopped or, alternatively, a corresponding point may further be searched among the searched points for a possibly exact point to calculate a motion vector.

In this way, the reliability of the correspondence search can be assessed by means of performing, in the case shown in FIG. 11, the correspondence search among the images taken at different time instants, and in the case shown in FIG. 12, performing the correspondence search using the stereo images. Here, the reliability assessment for the correspondence search may be performed at predetermined time intervals during the passage of time for example. More specifically, it may be performed at predetermined frame intervals. It may be performed depending on the values of the similarity obtained as a result of the computation of the correlation value during the correspondence search. For example, when the POC algorithm is used, the correspondence search may be performed using the two techniques when the POC value is smaller than a predetermined threshold value. In addition, for example, when the SAD algorithm is used, the correspondence search may be performed using the two techniques when the correlation value is lower than a predetermined threshold value. In these cases, it is likely not to be matched correctly. In addition, it may be performed when a significant change is found relative to preceding motion vector(s). For example, the correspondence search may be performed using the two techniques when the magnitude of the motion vector is increased by two or more times or the direction thereof is changed by 5 degrees or more. Although the motion vector to be compared may be all motion vectors that have previously been calculate, the immediately preceding motion vector may be used for this comparison. In addition, it may be performed depending on the contrast of the defined template. For example, the correspondence search may be performed using the two techniques when the contrast within the template is lower than a predetermined threshold value.

The motion analysis unit 6 performs a predetermined analysis on the motion vector calculated by the motion vector calculation unit 5. Specifically, for example, results such as the distance information and the motion vector(s) are converted into a format suitable for being presented on the display unit 8.

Next, the operation of the motion vector generation apparatus 1 according to this embodiment is described. First, the camera 7 takes time-series stereo images. The images taken with the camera 7 are received by and stored in the image acquisition unit 2. The target point determination unit 3 acquires the image that is used at the beginning of the operation, out of the images stored in the image acquisition unit 2, and determines the target point to send it to the corresponding point search unit 4. The corresponding point search unit 4 acquires the image corresponding to the image in which the target point has determined by the target point determination unit 3, out of the images stored in the image acquisition unit 2, and performs the correspondence search to find the corresponding point to the target point at the sub-pixel level. Although the correspondence search method used may be the above-mentioned method, any method other than the above may be used as long as it can search the corresponding point at the sub-pixel level based on the target point at the sub-pixel level. The corresponding point search unit 4 sends the target point and the found corresponding point to the motion vector calculation unit 5. In addition, if it is necessary to search a point corresponding to that point, out of the corresponding points found by the corresponding point search unit 4, that corresponding point is determined as the target point by the target point determination unit 3. Then, again, it is sent to the corresponding point search unit 4 and the corresponding point is searched. Subsequently, the above-mentioned processing is repeated. In addition, in this way, during the time when the correspondence search is performed, as described above, the corresponding point search unit 4 assesses the reliability of the correspondence search as needed. When the reliability is low, a measure such as stopping the operation may be taken.

The motion vector calculation unit 5 calculates, for example, the distance information and the motion vectors from the point found by the corresponding point search unit 4, using the above-mentioned method. Then, the result is sent to the motion vector analysis unit 6. The motion vector analysis unit 6 performs a predetermined analysis in order to, for example, present, for example, the distance information and the motion vector on the display unit 8. Then, the result of the analysis for the generated motion vector is sent to the display unit 8 and presented thereon.

In this way, the motion vector generation apparatus 1 according to this embodiment can directly find the corresponding point to the sub-pixel level position even when the target point is located at that position during the correspondence search. In addition, the point corresponding to the corresponding point at the computed sub-pixel level position is directly found and it is repeated. This makes it possible to generate a consecutive and highly-accurate motion vector.

In other words, the corresponding point is directly found from the coordinates of the target point without correcting the coordinates, so that the motion vector generation apparatus 1 according to this embodiment has an effect in that a more accurate motion vector can be generated.

The present specification discloses the techniques according to various aspects as described above, of which some techniques are summarized below.

A motion vector generation apparatus according to one aspect comprises an image acquisition unit for acquiring and holding a plurality of images; a target point determination unit for determining a target point at a sub-pixel level in one of the plurality of images held in the image acquisition unit; a corresponding point search unit for searching a corresponding point corresponding to the target point at a sub-pixel level in an image out of the plurality of images held in the image acquisition unit, the image being different from the image in which the target point is determined; and a motion vector calculation unit for calculating a motion vector according to the target point and the corresponding point, the target point determination unit determining, after the corresponding point search unit searches the corresponding point, the searched corresponding point as a target point in the searched image, and the motion vector calculation unit sequentially calculating motion vectors based on the sequentially determined target points and the searched corresponding points corresponding to the target points.

As apparent from the above, the motion vector generation apparatus finds the corresponding point for the target point at the sub-pixel level, and finds, at the sub-pixel level, the corresponding point relative to the sub-pixel level position by using the resulting corresponding point as the target point, which is repeated for a plurality of images such as a plurality of time-series images. As a result, each corresponding point is directly found for each target point, so that the motion vectors computed, for example, in time series are linked consecutively. In addition, the corresponding points that are sequentially found can be obtained with high accuracy relative to the target point. This allows more precise tracking of the trajectory of the target point.

In addition, in another aspect, in the above-mentioned motion vector generation apparatus, the corresponding point search unit defines a template in the image in which the target point is determined, the center of gravity of the template being located at the position of the target point, to search a corresponding point corresponding to the target point at the sub-pixel level, by using the template.

According to this configuration, using the template of which position of the center of gravity is defined at the sub-pixel level, the correspondence search is performed. Thus, the motion vector generation apparatus having such configuration can directly find the point corresponding to the target point at the sub-pixel level, which results in the achievement of highly accurate correspondence search.

In addition, in another aspect, in the above-mentioned motion vector generation apparatus, the corresponding point search unit defines a template in the image in which the target point is determined, the center of gravity of the template being located at the position of a pixel that is nearest to the target point, searches a point corresponding to the position of the center of gravity of the pixel using the template, and displaces the position of the searched point by an amount of displacement between the target point and the position of the center of gravity of the pixel that is nearest to the target pixel to search the corresponding point at the sub-pixel level.

According to this configuration, without performing any direct operation at the sub-pixel level, the operation at the pixel level can provide the corresponding point. This corresponding point is shifted later to perform the correspondence search at the sub-pixel level. Thus, the motion vector generation apparatus having such configuration requires a smaller amount of operation in a shorter operation time duration.

In addition, in another aspect, in the above-mentioned motion vector generation apparatus, the corresponding point search unit defines a template in the image in which the target point is determined, the center of gravity of the template being located at the position of a pixel that is nearest to the target point, searches, using the template, a point in an image different from the image in which the target point is determined, the point being corresponding to the position of the center of gravity of the pixel, and displaces the position of the searched point by an amount of displacement between the target point and the position of the center of gravity of the pixel that is nearest to the target pixel to search the corresponding point at the sub-pixel level.

According to this configuration as well, without performing any direct operation at the sub-pixel level, the operation at the pixel level can provide the corresponding point. This corresponding point is shifted later to perform the correspondence search at the sub-pixel level. Thus, the motion vector generation apparatus having such configuration requires a smaller amount of operation in a shorter operation time duration.

In addition, in another aspect, in the above-mentioned motion vector generation apparatus, the plurality of images have two or more pairs of stereo images, the target point determination unit determining the target point at the sub-pixel level in one image of the pair of stereo images, and the corresponding point search unit further searching, at the sub-pixel level, a corresponding point corresponding to the target point in another image that pairs with the image in which the target point is determined.

The motion vector generation apparatus having such configuration can obtain the distance information by using stereo images.

In addition, in another aspect, in the above-mentioned motion vector generation apparatus, the motion vector calculation unit further computes distance information at the time when the pair of stereo images are taken, according to points corresponding to each other between the pair of stereo images, the motion vector calculation unit being configured to use also the distance information in calculating the motion vector.

According to this configuration, the stereo images can be used to obtain the distance information such as the distance from the camera to the target point. Thus, the motion vector generation apparatus having such configuration can compute a three-dimensional motion vector.

In addition, in another aspect, in the above-mentioned motion vector generation apparatus, the plurality of images have two or more pairs of stereo images in time series, the target point determination unit determining the target point at the sub-pixel level in one image of the pair of stereo images, the corresponding point search unit searching a corresponding point at the sub-pixel level in an image corresponding to the image in which the target point is determined, the corresponding point being corresponding to the target point, the image being one of the stereo images taken at a time instant that is different from the one at which the image in which the target point is determined is taken, the target point determination unit determining the corresponding point corresponding to the target point as a target point sequentially searching a corresponding point at the sub-pixel level in an image corresponding to the image in which the target point is determined, the corresponding point being corresponding to the target point, the image being one of the stereo images taken at a time instant that is different from the one at which the image in which the target point is determined is taken, and searching, at the sub-pixel level, a corresponding point corresponding to the target point in another image that pairs with the image in which the target point is determined.

According to this configuration, by searching the points corresponding to each other between the images of consecutive time-series stereo images, the motion vector generation apparatus having such configuration can obtain the distance information such as the distance from the camera to the target point, and can compute a three-dimensional motion vector.

In addition, in another aspect, in the above-mentioned motion vector generation apparatus, the plurality of images have two or more pairs of stereo images in time series, the target point determination unit determining the target point at the sub-pixel level in one image of the pair of stereo images, the corresponding point search unit further searching, at the sub-pixel level, a corresponding point corresponding to the target point in another image that pairs with the image in which the target point is determined, the target point determination unit determining the corresponding point corresponding to the target point in the one image as well as the target point in the other image, as target points, and sequentially searching corresponding points corresponding to the respective target points at the sub-pixel level in an image corresponding to the images having the respective target points, out of a pair of stereo images taken at a time instant that is different from the one at which the images having the respective target points are taken.

According to this configuration, by searching the points corresponding to each other between the images of consecutive time-series stereo images, the motion vector generation apparatus having such configuration can obtain the distance information such as the distance from the camera to the target point, and can compute a three-dimensional motion vector.

In addition, in another aspect, in the above-mentioned motion vector generation apparatus, the corresponding point search unit generates the template by means of interpolating the image.

The motion vector generation apparatus having such configuration can use well-known image processing method such as bilinear interpolation (bilinear) and bicubic interpolation (bicubic), and can easily generate an appropriate template for searching.

In addition, in another aspect, in the above-mentioned motion vector generation apparatus, the corresponding point search unit generates the template using a window function.

In the motion vector generation apparatus having such configuration, a window function is used to generate the template that is arranged at a pseudo sub-pixel level. Therefore, for example, the window function used when the correspondence search is performed using the frequency resolution causes sub-pixel displacement in a pseudo manner to generate the template. Accordingly, the motion vector generation apparatus having such configuration can easily generate an appropriate template. In addition, when the correspondence search is performed using the frequency resolution, no additional processing should be added and fast processing can be made.

In addition, in another aspect, in the above-mentioned motion vector generation apparatus, when searching two or more corresponding points that correspond to one target point, the corresponding point search unit uses the same correspondence search method for the search of any corresponding point.

In the motion vector generation apparatus having such configuration, in any correspondence search, the template can be shared, so that the motion vector generation apparatus having such configuration can reduce the time duration required for defining the template.

In addition, in another aspect, in the above-mentioned motion vector generation apparatus, the corresponding point search unit searches one corresponding point according to two or more target points.

The motion vector generation apparatus having such configuration can assess the reliability of the correspondence search. That is, for example, the correspondence search is performed using two or more target points relative to which the same corresponding point should be found. If the same corresponding point cannot be found, it is possible to consider that the reliability of the correspondence search is low.

In addition, in another aspect, in the above-mentioned motion vector generation apparatus, when searching a corresponding point in one image of a pair of stereo images taken at the same time instant based on a point in another image of the pair, the corresponding point search unit searches, under a predetermined condition, the corresponding point based on a point in an image corresponding in time series to the other image, taken at a time instant that is different from the one at which the other image is taken.

The motion vector generation apparatus having such configuration can assess the reliability of the correspondence search.

In addition, in another aspect, in the above-mentioned motion vector generation apparatus, when searching a corresponding point based on a point in an image taken at a different time instant and corresponding in time series, the corresponding point search unit searches, under a predetermined condition, the corresponding point based on a point in one image of a pair of stereo images taken at the same time instant as the image in which the corresponding point is searched.

The motion vector generation apparatus having such configuration can assess the reliability of the correspondence search.

In addition, in another aspect, in the above-mentioned motion vector generation apparatus, the predetermined condition is a predetermined number of frames.

The motion vector generation apparatus having such configuration assesses the reliability of the above-mentioned correspondence search for every certain number of frames of the time-series images. Thus, it is periodically monitored so that no mis-tracking is caused.

In addition, in another aspect, in the above-mentioned motion vector generation apparatus, the predetermined condition is determined according to the similarity in the correspondence search.

The motion vector generation apparatus having such configuration can assess the reliability of the correspondence search when it is likely that the correspondence search is not correctly performed. That is, when the similarity is low in the correspondence search, it is likely that the correspondence search is not correctly performed. Accordingly, in this case, it can be determined that the correspondence search is possibly wrong.

In addition, in another aspect, in the above-mentioned motion vector generation apparatus, the predetermined condition is determined according to the motion vector.

The motion vector generation apparatus having such configuration can assess the reliability of the correspondence search when it is likely that the correspondence search is not correctly performed. That is, the magnitude or direction of the motion vector is larger than, for example, the one for the immediately preceding motion vector, it is likely that the correspondence search is not correctly performed. Accordingly, in this case, it can be determined that the correspondence search is wrong.

In addition, in another aspect, in the above-mentioned motion vector generation apparatus, the predetermined condition is determined according to a contrast in the template.

The motion vector generation apparatus having such configuration can assess the reliability of the correspondence search when it is likely that the correspondence search is not correctly performed. That is, when the contrast is low in the template, it is likely that the correspondence search is not correctly performed. Accordingly, in this case, it can be determined that the correspondence search is wrong.

In addition, in another aspect, in the above-mentioned motion vector generation apparatus, the corresponding point search unit searches a point which corresponds using an image pattern of the template of which frequency is resolved and amplitude component is restricted.

The motion vector generation apparatus having such configuration restricts the amplitude component from the frequency component. Accordingly, it is insusceptible to the noise or the difference in luminance between images, allowing robust correspondence search.

In addition, in another aspect, in the above-mentioned motion vector generation apparatus, when searching two or more corresponding points that correspond to one target point, the corresponding point search unit uses the same image pattern of the template of which frequency is resolved and amplitude component is restricted, for the search of any corresponding point.

The motion vector generation apparatus having such configuration can share the image pattern of the template of which frequency is resolved and amplitude component is restricted, so that it is possible to reduce the operation processing time.

In addition, in another aspect, in the above-mentioned motion vector generation apparatus, the corresponding point search unit generates the template by rotating a phase component of the image pattern in a frequency domain.

The motion vector generation apparatus having such configuration can generate the template for searching by rotating the phase component in the frequency domain in the correspondence search involving the frequency resolution, which allows fast processing.

In addition, in another aspect, in the above-mentioned motion vector generation apparatus, the frequency resolution is either one of FFT, DFT, DCT, DST, wavelet transform, and Hadamard transform.

According to this configuration, the frequency is resolved by using a commonly used and already-established approach, so that the motion vector generation apparatus having such configuration can ensure positive frequency resolution.

In addition, in another aspect, in the above-mentioned motion vector generation apparatus, the corresponding point search unit searches a corresponding point using phase-only correlation.

The motion vector generation apparatus having such configuration allows searching with higher accuracy using the phase-only correlation.

In addition, a motion vector generation method according to another aspect comprises a target point determination step of determining a target point at a sub-pixel level in one image of a plurality of images; a corresponding point search step of searching a corresponding point corresponding to the target point at the sub-pixel level in an image that is different from the image in which the target point is determined, out of the plurality of images; a step of determining the corresponding point searched in the corresponding point search step as a target point in the image in which the corresponding point is searched, and repeating the corresponding point search step; and a motion vector calculation step of calculating a motion vector according to the target point and the corresponding point.

The motion vector generation method having such procedures generates the motion vectors by means of repeating the steps of determining the corresponding point for the target point at the sub-pixel level, and determining the corresponding point at the sub-pixel level relative to the sub-pixel level position using the determined corresponding point as the target point. As a result, the generated motion vectors are consecutively linked. In addition, the corresponding points that are sequentially found are obtained with high accuracy relative to the target point, which results in more precise tracking of the trajectory of the target point.

This application claims priority of Japanese Patent Application No. 2009-3655, filed Jan. 9, 2009, and the entire teachings of which are incorporated in this application by reference.

While the present invention has been described fully and appropriately with regard to the embodiment thereof with reference to the drawings in order to express the present invention, it will be recognized by those skilled in the art that the above-mentioned embodiment may be readily subject to various modifications and/or improvement. Such modifications and improvements made by those skilled in the art are also intended to fall within the scope of the appended claims unless the modifications and improvements depart from the scope of the appended claims.

INDUSTRIAL APPLICABILITY

According to the present invention, there is provided a motion vector generation apparatus and a motion vector generation method for generating motion vectors.

The invention claimed is:

1. A motion vector generation apparatus comprising:
an image acquisition unit to capture and hold a plurality of time-series images;
a target point determination unit configured to determine a target point at a sub-pixel level in one of the plurality of time-series images held in the image acquisition unit;
a corresponding point search unit configured to search for a corresponding point at a sub-pixel level corresponding to the target point, the corresponding point being in an image contained in the plurality of time-series images in the image acquisition unit, the image being different from the one of the plurality of time-series images in which the target point is determined;
a motion vector calculation unit coupled to the image acquisition unit and coupled to a central processing unit and memory storage, and configured to calculate a motion vector according to the target point and the corresponding point;

wherein, after the corresponding point search unit searches the corresponding point, the target point determination unit determines the corresponding point searched at a sub-pixel level as a new target point in the searched image, and the corresponding point search unit searches for the corresponding point at a sub-pixel level corresponding to the new target point determined at the sub-pixel level, wherein the corresponding point is in a time-series image that is different from a time-series image in which the new target point is determined; and wherein the determining the corresponding point searched at a sub-pixel level as a new target point in the searched image by the target point determination unit, and the searching for the corresponding point at a sub-pixel level corresponding to the new target point determined at the sub-pixel level by the corresponding point search unit are iteratively repeated; and wherein the motion vector calculation unit sequentially calculates motion vectors based on each target point and each searched corresponding point corresponding to the target point in the one of the plurality of time-series images, wherein each target point and each corresponding point is iteratively determined or searched.

2. The motion vector generation apparatus according to claim 1, wherein the corresponding point search unit defines a template in the one of the plurality of time-series images in which the target point is determined, the center of gravity of the template being located at the position of the target point, to search a corresponding point corresponding to the target point at the sub-pixel level, by using the template.

3. The motion vector generation apparatus according to claim 2, wherein the corresponding point search unit generates the template by interpolating the image.

4. The motion vector generation apparatus according to claim 2, wherein the corresponding point search unit generates the template using a window function.

5. The motion vector generation apparatus according to claim 2, wherein the corresponding point search unit searches for the corresponding point using an image pattern of the template of which frequency is resolved and amplitude component is restricted.

6. The motion vector generation apparatus according to claim 5, wherein when searching two or more corresponding points that correspond to one target point, the corresponding point search unit uses an image pattern that is identical to the image pattern of the template of which frequency is resolved and amplitude component is restricted, for the search of any corresponding point.

7. The motion vector generation apparatus according to claim 5, wherein the corresponding point search unit generates the template by rotating a phase component of the image pattern of the template in a frequency domain.

8. The motion vector generation apparatus according to claim 5, wherein a frequency resolution is either one of FFT, DFT, DCT, DST, wavelet transform, and Hadamard transform.

9. The motion vector generation apparatus according to claim 2, wherein the corresponding point search unit searches a corresponding point using phase-only correlation.

10. The motion vector generation apparatus according to claim 1, wherein the corresponding point search unit defines a template in the one of the plurality of time-series images in which the target point is determined, the center of gravity of the template being located at the position of a pixel that is nearest to the target point, searches a point corresponding to the position of the center of gravity of the pixel using the template, and displaces the position of the searched point by an amount of displacement between the target point and the position of the center of gravity of the pixel that is nearest to the target pixel to search the corresponding point at the sub-pixel level.

11. The motion vector generation apparatus according to claim 1, wherein the corresponding point search unit defines a template in the one of the plurality of time-series images in which the target point is determined, the center of gravity of the template being located at the position of a pixel that is nearest to the target point, searches, using the template, a point in an image different from the one of the plurality of time-series images in which the target point is determined, the point being corresponding to the position of the center of gravity of the pixel, and displaces the position of the searched point by an amount of displacement between the target point and the position of the center of gravity of the pixel that is nearest to the target pixel to search the corresponding point at the sub-pixel level.

12. The motion vector generation apparatus according to claim 1, wherein the image acquisition unit captures and holds a pair of stereo images, wherein a first image of the pair of stereo images being any one of the plurality of time-series images and a second image of the pair of stereo images corresponding to the first image, the target point determination unit determining the target point at the sub-pixel level in the first image of the pair of stereo images, and the corresponding point search unit further searching, at the sub-pixel level, a corresponding point corresponding to the target point in the second image of the pair of stereo images.

13. The motion vector generation apparatus according to claim 12, wherein the motion vector calculation unit further computes distance information at the time when the pair of stereo images are taken, according to points corresponding to each other between the pair of stereo images, the motion vector calculation unit being configured to use also the distance information in calculating the motion vector.

14. The motion vector generation apparatus according to claim 12, wherein the corresponding point search unit searches one corresponding point according to two or more target points in images different from each other.

15. The motion vector generation apparatus according to claim 12, wherein when searching a corresponding point in the second image of a pair of stereo images taken at the same time instant as the first image of the pair of stereo images based on a point in the first image of the pair of stereo images, the corresponding point search unit searches, under a predetermined condition, the corresponding point based on a point in a time-series image corresponding to the second image, taken at a first time instant that is different from a second time instant at which the second image is taken.

16. The motion vector generation apparatus according to claim 15, wherein the predetermined condition is a predetermined number of frames.

17. The motion vector generation apparatus according to claim 15, wherein the predetermined condition is determined according to a similarity in the correspondence search.

18. The motion vector generation apparatus according to claim 15, wherein the predetermined condition is determined according to one of the motion vectors.

19. The motion vector generation apparatus according to claim 15, wherein the corresponding point search unit defines a template in the one of the plurality of time-series images in which the target point is determined, the center of gravity of the template being located at the position of the target point, to search a corresponding point correspond to the target point at the sub-pixel level by using the template; and wherein the predetermined condition is determined according to a contrast in the template.

20. The motion vector generation apparatus according to claim 12, wherein when searching a corresponding point based on a target point in a time-series image, the corresponding point being in a time-series image taken at a different time instant from the time-series image in which the target point is determined, the corresponding point search unit searches, under a predetermined condition, the corresponding point based on a point in the first image of the pair of stereo images in the second image of the pair of stereo images taken at an identical time instant as the first image.

21. The motion vector generation apparatus according to claim 1, wherein the image acquisition unit captures and holds two or more pairs-of stereo images in time series, wherein a first image of each of the two or more pairs of stereo images being one of the plurality of time-series images and a second image of each of the two or more pairs of stereo images corresponding to the first image, the target point determination unit determining the target point at the sub-pixel level in the first image of one of the two or more pairs-of stereo images, the corresponding point search unit searching a corresponding point at the sub-pixel level in an image corresponding to the first image of the one of the two or more pairs of stereo images in which the target point is determined, the corresponding point being corresponding to the target point, the image being one of the two or more pairs of stereo images taken at a time instant that is different from the first image of the one of the two or more pairs of stereo images in which the target point is determined is taken, and the target point determination unit determining the corresponding point corresponding to the target point as a target point, sequentially searching a corresponding point at the sub-pixel level in a time-series image corresponding to the first image of the one of the two or more pairs of stereo images in which the target point is determined, the corresponding point being corresponding to the target point, the image being one of the two or more pairs of stereo images taken at a time instant that is different from the first image of the one of the two or more pairs of stereo images in which the target point is determined is taken, and searching, at the sub-pixel level, a corresponding point corresponding to the target point in a second image that pairs with the first image of the one of the two or more pairs of stereo images in which the target point is determined.

22. The motion vector generation apparatus according to claim 21, wherein when searching two or more corresponding points that correspond to one target point in images different from each other, the corresponding point search unit uses the same correspondence search method for the search of any corresponding point.

23. The motion vector generation apparatus according to claim 1, wherein the image acquisition unit captures and holds two or more pairs of stereo images in time series, the target point determination unit determining the target point at the sub-pixel level in a first image of one of the two or more pairs of stereo images, the corresponding point search unit further searching, at the sub-pixel level, a corresponding point corresponding to a target point in a second image that pairs with the first image in which the target point is determined, the target point determination unit determining the corresponding point corresponding to the target point in the first image as well as the target point in the second image, as target points, and sequentially searching corresponding points corresponding to the respective target points at the sub-pixel level of the first image and the second image in images corresponding to the first image and the second image, wherein the images are out of a pair of stereo images taken at a first time instant that is different from a second time instant at which the first image and the second image are taken.

24. A motion vector generation method comprising:

determining a target point at a sub-pixel level in a first image of a plurality of time-series images;

searching a corresponding point corresponding to the target point at a sub-pixel level in a second image that is different from the first image in which the target point is determined, out of the plurality of time-series images;

determining the corresponding point searched at the sub-pixel level in the corresponding point search step as a new target point in the second image in which the corresponding point is searched, wherein the determining the corresponding point searched at the sub-pixel level as the new target point in the corresponding point search step and the searching for the corresponding point at the sub-pixel level corresponding to the new target point determined at the level in the second image are iteratively repeated; and calculating a motion vector according to each target point and each corresponding point that is iteratively searched or determined, wherein the calculating is based on time-series images.

* * * * *